(12) United States Patent
Kutz et al.

(10) Patent No.: US 11,757,588 B2
(45) Date of Patent: Sep. 12, 2023

(54) SHARING CONTROL CHANNEL AND PILOT RESOURCES

(71) Applicant: QUALCOMM Incorporated, San Diego, CA (US)

(72) Inventors: Gideon Shlomo Kutz, Ramat Hasharon (IL); Tal Oved, Modiin (IL); Amit Bar-Or Tillinger, Tel-Aviv (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/328,309

(22) Filed: May 24, 2021

(65) Prior Publication Data

US 2022/0376854 A1 Nov. 24, 2022

(51) Int. Cl.
*H04L 5/00* (2006.01)
*H04W 72/27* (2023.01)

(52) U.S. Cl.
CPC .......... *H04L 5/0048* (2013.01); *H04L 5/0035* (2013.01); *H04L 5/0037* (2013.01); *H04L 5/0053* (2013.01); *H04W 72/27* (2023.01)

(58) Field of Classification Search
CPC ... H04L 5/0048; H04L 5/0035; H04L 5/0037; H04L 5/0053; H04W 72/0426
USPC .......................................................... 370/329
See application file for complete search history.

(56) References Cited

U.S. PATENT DOCUMENTS

2010/0097937 A1* 4/2010 Pietraski ............... H04L 5/0007
                                                         370/330
2016/0316459 A1* 10/2016 Popovic ................ H04L 5/0048
2019/0349158 A1* 11/2019 Wang .................. H04W 72/042

* cited by examiner

*Primary Examiner* — Chi Tang P Cheng
(74) *Attorney, Agent, or Firm* — Muncy, Geissler, Olds & Lowe, P.C.

(57) ABSTRACT

One or more techniques for sharing control channel and pilot resources are disclosed.

30 Claims, 12 Drawing Sheets

SHARING CONTROL CHANNEL AND PILOT RESOURCES

TECHNICAL FIELD

Various aspects described herein generally relate to wireless communication systems, and more particularly, to reducing overhead required for control messages.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long-Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An exemplary user equipment (UE) is disclosed. The UE may comprise a memory, a transceiver and a processor communicatively connected to the memory and the processor. The processor may be configured to receive one or more pilot transmissions from a network node. Each pilot transmission may comprise one or more resource blocks (RB), and each RB may comprise a plurality of resource elements (RE). The plurality of REs of each RB may comprise one or more pilot REs and one or more control REs. Each pilot RE may carry a pilot signal and each control RE may carry control data of a control channel. The control data may be encoded. The processor may also be configured to demodulate at least one control RE of at least one RB of at least one pilot transmission to decode the control data. The processor may further be configured to utilize the at least one control RE of the at least one RB of the at least one pilot transmission as a shared channel pilot, the shared channel pilot being a pilot signal of a shared channel.

An exemplary method performed by a user equipment (UE) is disclosed. The method may comprise receiving one or more pilot transmissions from a network node. Each pilot transmission may comprise one or more resource blocks (RB), and each RB may comprise a plurality of resource elements (RE). The plurality of REs of each RB may comprise one or more pilot REs and one or more control REs. Each pilot RE may carry a pilot signal and each control RE may carry control data of a control channel. The control data may be encoded. The method may also comprise demodulating at least one control RE of at least one RB of at least one pilot transmission to decode the control data. The method may further comprise utilizing the at least one control RE of the at least one RB of the at least one pilot transmission as a shared channel pilot, the shared channel pilot being a pilot signal of a shared channel.

Another exemplary user equipment (UE) is disclosed. The UE may comprise means for receiving one or more pilot transmissions from a network node. Each pilot transmission may comprise one or more resource blocks (RB), and each RB may comprise a plurality of resource elements (RE). The plurality of REs of each RB may comprise one or more pilot REs and one or more control REs. Each pilot RE may carry a pilot signal and each control RE may carry control data of a control channel. The control data may be encoded. The UE may also comprise means demodulating at least one control RE of at least one RB of at least one pilot transmission to decode the control data. The UE may further comprise means utilizing the at least one control RE of the at least one RB of the at least one pilot transmission as a shared channel pilot, the shared channel pilot being a pilot signal of a shared channel.

A non-transitory computer-readable medium storing computer-executable instructions for a user equipment (UE) is disclosed. The executable instructions may comprise one or more instructions instructing the UE to receive one or more pilot transmissions from a network node. Each pilot transmission may comprise one or more resource blocks (RB), and each RB may comprise a plurality of resource elements (RE). The plurality of REs of each RB may comprise one or more pilot REs and one or more control REs. Each pilot RE may carry a pilot signal and each control RE may carry control data of a control channel. The control data may be encoded. The executable instructions may also comprise one or more instructions instructing the UE to demodulate at least one control RE of at least one RB of at least one pilot transmission to decode the control data. The executable instructions may further comprise one or more instructions instructing the UE to utilize the at least one control RE of the at least one RB of the at least one pilot transmission as a shared channel pilot, the shared channel pilot being a pilot signal of a shared channel.

An exemplary network node is disclosed. The UE may comprise a memory, a transceiver and a processor communicatively connected to the memory and the processor. The processor may be configured to transmit one or more pilot transmissions to a user equipment (UE). Each pilot transmission may comprise one or more resource blocks (RB), and each RB may comprise a plurality of resource elements (RE). The plurality of REs of each RB may comprise one or more pilot REs and one or more control REs. Each pilot RE may carry a pilot signal and each control RE may carry control data of a control channel. The control data may be encoded. At least one control RE of at least one RB of at least one pilot transmission may be for use by the UE as a pilot signal of a shared channel.

An exemplary method performed by a network node is disclosed. The method may comprise transmitting one or more pilot transmissions to a user equipment (UE). Each pilot transmission may comprise one or more resource blocks (RB), and each RB may comprise a plurality of resource elements (RE). The plurality of REs of each RB may comprise one or more pilot REs and one or more control REs. Each pilot RE may carry a pilot signal and each control RE may carry control data of a control channel. The control data may be encoded. At least one control RE of at least one RB of at least one pilot transmission may be for use by the UE as a pilot signal of a shared channel.

Another exemplary network node is disclosed. The UE may comprise means for transmitting one or more pilot transmissions to a user equipment (UE). Each pilot transmission may comprise one or more resource blocks (RB), and each RB may comprise a plurality of resource elements (RE). The plurality of REs of each RB may comprise one or more pilot REs and one or more control REs. Each pilot RE may carry a pilot signal and each control RE may carry control data of a control channel. The control data may be encoded. At least one control RE of at least one RB of at least one pilot transmission may be for use by the UE as a pilot signal of a shared channel.

A non-transitory computer-readable medium storing computer-executable instructions for a network node is disclosed. The executable instructions may comprise one or more instructions instructing the network node to transmit one or more pilot transmissions to a user equipment (UE). Each pilot transmission may comprise one or more resource blocks (RB), and each RB may comprise a plurality of resource elements (RE). The plurality of REs of each RB may comprise one or more pilot REs and one or more control REs. Each pilot RE may carry a pilot signal and each control RE may carry control data of a control channel. The control data may be encoded. At least one control RE of at least one RB of at least one pilot transmission may be for use by the UE as a pilot signal of a shared channel.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
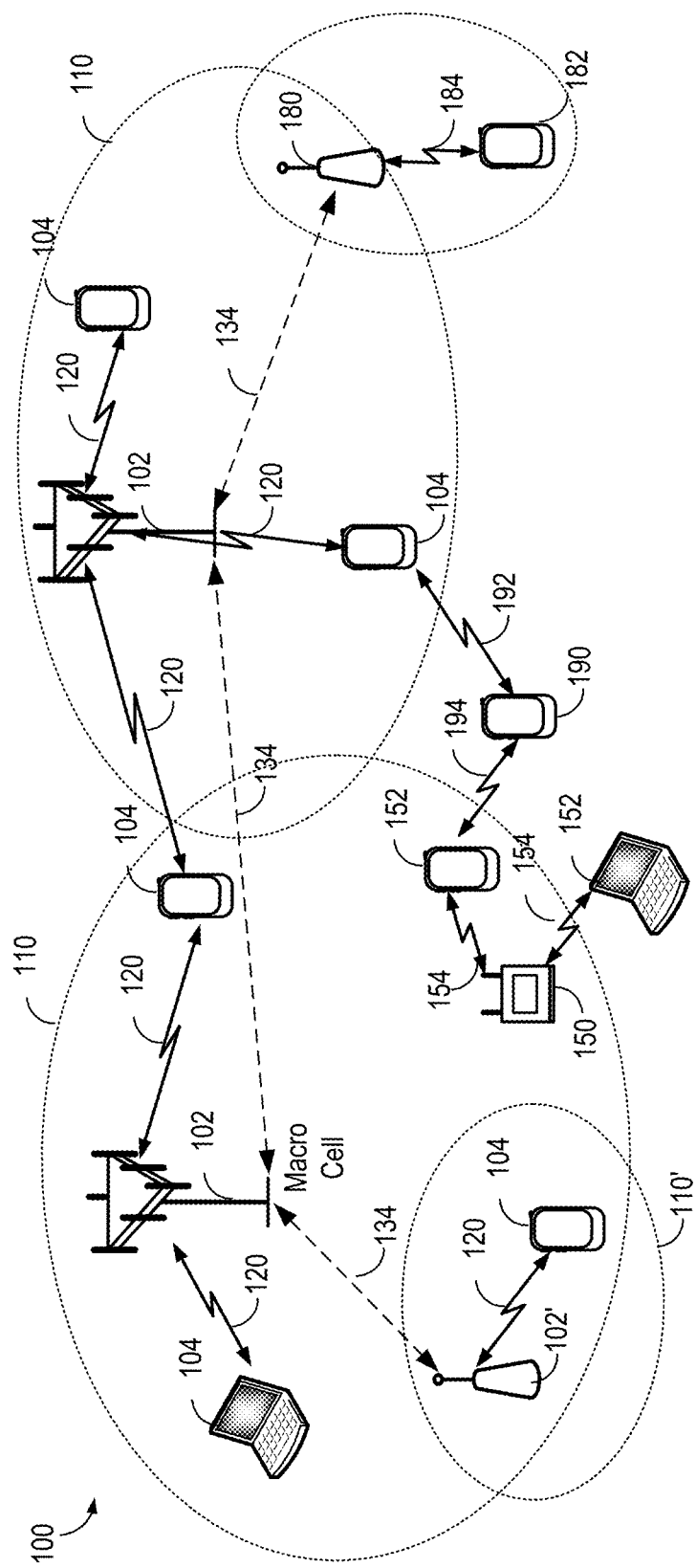
FIG. 1 illustrates an exemplary wireless communications system in accordance with one or more aspects of the disclosure.

Aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (UE) and "base station" are not intended to be specific or otherwise limited to any particular Radio Access Technology (RAT), unless otherwise noted. In general, such UEs may be any wireless communication device (e.g., a mobile phone, router, tablet computer, laptop computer, tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide edge node signaling functions while in other systems it may provide additional control and/or network management functions.

UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates an exemplary wireless communications system 100 according to one or more aspects. The wireless communications system 100, which may also be referred to as a wireless wide area network (WWAN), may include various base stations 102 and various UEs 104. The base stations 102 may include macro cells (high power cellular base stations) and/or small cells (low power cellular base stations). The macro cells may include Evolved NodeBs (eNBs) where the wireless communications system 100 corresponds to an Long-Term Evolution (LTE) network, gNodeBs (gNBs) where the wireless communications system 100 corresponds to a 5G network, and/or a combination thereof, and the small cells may include femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighbor macro cell geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cells may be known as a heterogeneous network. A heterogeneous network may also include Home eNBs (HeNBs) and/or Home gNodeBs, which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple input multiple output (MIMO) antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the radio frequency (RF) range in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on. Any of the base stations 102, 102', 180 may send measurement requests (e.g., measurement control order (MCO)) to the UEs 104, 182, 190, and the UE's 104, 182, 190 may respond with measurement reports accordingly.

Figure 2:
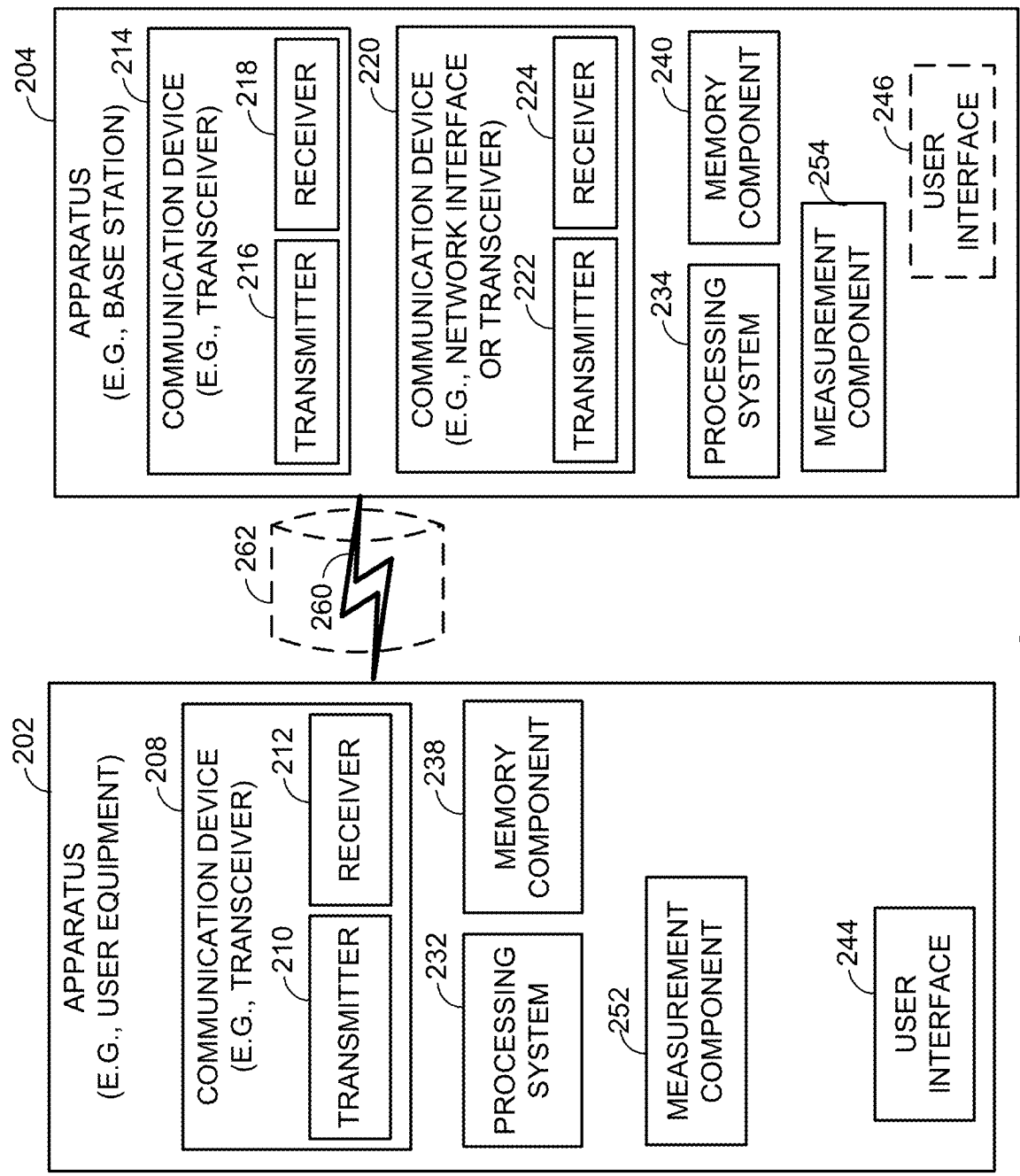
FIG. 2 is a simplified block diagram of several sample aspects of components that may be employed in wireless communication nodes and configured to support communication in accordance with one or more aspects of the disclosure.

FIG. 2 illustrates several sample components (represented by corresponding blocks) that may be incorporated into an apparatus 202 and an apparatus 204 (corresponding to, for example, a UE and a base station (e.g., eNB, gNB), respectively, to support the operations as disclosed herein. As an example, the apparatus 202 may correspond to a UE, and the apparatus 204 may correspond to a network node such as a gNB and/or an eNB. It will be appreciated that the components may be implemented in different types of apparatuses in different implementations (e.g., in an ASIC, in a System-on-Chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 202 and the apparatus 204 each may include at least one wireless communication device (represented by the communication devices 208 and 214) for communicating with other nodes via at least one designated RAT (e.g., LTE, New Radio (NR)). Each communication device 208 may include at least one transmitter (represented by the transmitter 210) for transmitting and encoding signals (e.g., messages, indications, information, and so on) and at least one receiver (represented by the receiver 212) for receiving and decoding signals (e.g., messages, indications, information, pilots, and so on) and may be referred to as a communication device or a transceiver. Each communication device 214 may include at least one transmitter (represented by the transmitter 216) for transmitting signals (e.g., messages, indications, information, pilots, and so on) and at least one receiver (represented by the receiver 218) for receiving signals (e.g., messages, indications, information, and so on) and may be referred to as a communication device or a transceiver.

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include a plurality of antennas, such as an antenna array, that permits the respective apparatus to perform transmit "beamforming," as described further herein. Similarly, a receiver may include a plurality of antennas, such as an antenna array, that permits the respective apparatus to perform receive beamforming, as described further herein. In an aspect, the transmitter and receiver may share the same plurality of antennas, such that the respective apparatus can only receive or transmit at a given time, not both at the same time. A wireless communication device (e.g., one of multiple wireless communication devices) of the apparatus 204 may also comprise a Network Listen Module (NLM) or the like for performing various measurements.

The apparatus 204 may include at least one communication device (represented by the communication device 220) for communicating with other nodes. For example, the communication device 220 may comprise a network interface (e.g., one or more network access ports) configured to communicate with one or more network entities via a wire-based or wireless backhaul connection. In some aspects, the communication device 220 may be implemented as a transceiver configured to support wire-based or wireless signal communication. This communication may involve, for example, sending and receiving messages, parameters, or other types of information. Accordingly, in the example of FIG. 2, the communication device 220 is shown as comprising a transmitter 222 and a receiver 224 (e.g., network access ports for transmitting and receiving).

The apparatuses 202 and 204 may also include other components used in conjunction with the operations as disclosed herein. The apparatus 202 may include a processing system 232 for providing functionality relating to, for example, communication with the network. The apparatus 204 may include a processing system 234 for providing functionality relating to, for example, communication with the UEs. In an aspect, the processing systems 232 and 234 may include, for example, one or more general purpose processors, multi-core processors, ASICs, digital signal processors (DSPs), field programmable gate arrays (FPGA), or other programmable logic devices or processing circuitry.

The apparatuses 202 and 204 may include measurement components 252 and 254 that may be used to obtain channel related measurements. The measurement component 252 may measure one or more downlink (DL) signals such as channel state information reference signal (CSI-RS), phase tracking reference signal (PTRS), primary synchronization signal (PSS), secondary synchronization signal (SSS), demodulation reference signal (DMRS), etc. The measurement component 254 may measure one or more uplink (UL) signals such as DMRS, sounding reference signal (SRS), etc.

The apparatuses 202 and 204 may include memory components 238 and 240 (e.g., each including a memory device), respectively, for maintaining information (e.g., information indicative of reserved resources, thresholds, parameters, and so on). In various implementations, memory 238 can comprise a computer-readable medium storing one or more computer-executable instructions for a user equipment (UE) where the one or more instructions instruct apparatus 202 (e.g., processing system 232 in combination with communications device 208 and/or other aspects of apparatus 202) to perform any of the functions of FIGS. 3, 4, and 5. In addition, the apparatuses 202 and 204 may include user interface devices 244 and 246, respectively, for providing indications (e.g., audible and/or visual indications) to a user and/or for receiving user input (e.g., upon user actuation of a sensing device such a keypad, a touch screen, a microphone, and so on).

For convenience, the apparatuses 202 and 204 are shown in FIG. 2 as including various components that may be configured according to the various examples described herein. It will be appreciated, however, that the illustrated blocks may have different functionality in different designs. The components of FIG. 2 may be implemented in various ways. In some implementations, the components of FIG. 2 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 208, 232, 238, and 244 may be implemented by processor and memory component(s) of the apparatus 202 (e.g., by execution of appropriate code and/or by appropriate configuration of processor components). Similarly, some or all of the functionality represented by blocks 214, 220, 234, 240, and 246 may be implemented by processor and memory component(s) of the apparatus 204 (e.g., by execution of appropriate code and/or by appropriate configuration of processor components).

In an aspect, the apparatus 204 may correspond to a "small cell" or a Home gNodeB. The apparatus 202 may transmit and receive messages via a wireless link 260 with the apparatus 204, the messages including information related to various types of communication (e.g., voice, data, multimedia services, associated control signaling, etc.). The wireless link 260 may operate over a communication medium of interest, shown by way of example in FIG. 2 as the medium 262, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the apparatus 204 and the apparatus 202 for the medium 262.

In general, the apparatus 202 and the apparatus 204 may operate via the wireless link 260 according to one or more radio access types, such as LTE, LTE-U, or NR, depending on the network in which they are deployed. These networks may include, for example, different variants of CDMA networks (e.g., LTE networks, NR networks, etc.), TDMA networks, FDMA networks, Orthogonal FDMA (OFDMA) networks, Single-Carrier FDMA (SC-FDMA) networks, and so on.

Multiple incremental redundancy scheme (MIRS) is a rate adaptation scheme based on multiple incremental redundancy hybrid automated repeat request (IR-HARD) retransmissions that show significant gains over the existing rate adaptation methods in which probe or sounding signals are sent from the transmitter to the receiver. In the downlink, the cell is the transmitter and the UE is the receiver and the signal may be the channel state information reference signal (CSI-RS). In the uplink, the UE is the transmitter and the cell is the receiver and the signal may be the sounding reference signal (SRS). The receiver estimates the channel conditions based on the received sounding signal and decides on the modulation and coding scheme (MCS) to utilize the full capacity of the channel. For example, if the channel conditions are good, e.g., has high signal-to-noise ratio (SNR), then high data rate modulation such as 64 or 256 quadrature amplitude modulation (QAM) may be used. On the other hand, if the channel conditions are poor, e.g., has low SNR, then a robust modulation scheme such as quadrature phase shift keying (QPSK) may be utilized.

A significant issue with the rate adaptation scheme based on the sounding signals is that it is unable to quickly adapt, i.e., it is unable to follow changing channel conditions quickly. Channel conditions can change due to mobility. For example, the UE may be in an automobile. Even walking with some speed can cause changes in channel conditions. Since the sounding signal-based rate adaptation does not track changes efficiently, capacity may be lost. That is, the full capacity of the channel may not be utilized.

MIRS is a different concept of rate matching scheme. Briefly, in MIRS, initial transmission of data may performed with a very high optimistic view. That is, the initial transmission may be with highest coding rate possible and with highest modulation possible based on the channel conditions. In other words, the MCS for the initial transmission from the transmitter to the receiver is likely to be set for more than the actual capacity of the channel. As a result, it is very likely that a transmitter will receive a NACK from the receiver.

As a result of receiving the NACK, the transmitter transmits a second transmission of the same data. The second transmission is very thin, i.e., there are very few added bits for encoding. In other words, there is an incremental increase in the coding bits. There is a corresponding incremental decrease in the data bits. The receiver may correctly decode the transmission time interval (TTI)/transport block (TB) with the incrementally increased coding.

However, if the receiver sends another NACK (or if the transmitter does not hear the ACK from the receiver), then the process may be repeated. That is, the transmitter may further incrementally increase the coding bits/incrementally decrease the data bits and retransmit the data. until receiver decodes and the transmitter becomes aware that the transmitted data has been received correctly (e.g., by receiving ACK). By doing the incremental change enough times, the receiver will eventually decode and send the ACK, and the transmitter may send new data.

With MIRS, it is possible to ensure that full or close to full capacity of the channel will be utilized. Significant gains over the conventional rate adaption (e.g., based on sounding signals) is possible. This is because unlike the conventional rate matching scheme, MIRS is able to track the channel capacity even when the channel conditions change quickly.

In 5G, both the control channel (e.g., physical downlink control channel (PDCCH)) and the shared channel (e.g., physical downlink shared channel (PDSCH)) are transmitted each with its own dedicated reference signal, such that each channel can be demodulated using its respective reference signal. The reference signals are used by the receiver (e.g., UE) for estimations of timing offset, frequency offset, channel response, noise power, delay spread and doppler spread. This approach is inefficient as PDCCH and demodulation reference signal (DMRS) both consume resources in frequency/time leaving less resources for data, and therefore lowers spectral efficiency. This can be especially critical for MIRS.

While MIRS can track channel capacity quickly, there are issues with MIRS. One of the difficulties in MIRS is that it needs large control messages due to the usage of multiple transport blocks per allocation. That is, there is significant amount of control overhead with MIRS. For example, size of downlink control information (DCI) can become large. In some allocated resource slots, previously failed transmissions may be transmitted again. But it may be that only few bits are sent for the retransmissions. It may be undesirable to dedicate an entire slot just to send few bits. Thus, for the remaining space in the same slots, the transmitter may want to send brand new transmissions.

Such scenario may be played for each of one or more allocated slots—some additional bits may be sent for previously failed TBs and remaining space may be used to send new TBs. Eventually, there can be many TBs within a slot. Each TB may represent a different transmission number. For example, some may be for initial transmissions, others may be retransmissions one previous TB, and still others may be retransmission of other previous TBs. To describe such a situation, many control bits—e.g., DCI bits—may be required.

To address such issues, it is desirable to efficiently transmit control bits. In one or more aspect, it is proposed to embed information in pilot signals. That is, certain resource elements (RE) may serve multiple purposes. For example, certain REs may be used for control (e.g., DCI control) and used for pilot (e.g., DMRS pilot for data). In regards to MIRS, overhead required for MIRS control messages may be reduced by sharing resources with PDSCH DMRS.

The following are some of the proposals for resource sharing to reduce control overhead. In a first proposal, PDCCH DMRS resources and $1^{st}$ part of PDSCH DMRS resources may be shared. In this proposal, pilots of control and pilots of data may be shared.

In a second proposal, DCI (e.g., control data) resources and $2^{nd}$ part of PDSCH DMRS resources may be shared. Note that $1^{st}$ and $2^{nd}$ parts of DMRS resources constitute complete set of PDSCH DMRS resources. In this proposal, the DCI may be sent over same bandwidth (BW) and over same number of ports as the PDSCH. In this way, the same resources may be used to send the DCI, and also may be used as phase references to DMRS.

In most instances, PDCCH SNR requirements are typically low—i.e., lower than the corresponding PDSCH. Thus, there can be a gap between requirements for decoding PDCCH and requirements for decoding PDSCH. PDCCH requirements can manage with much less pilots than PDSCH. PDSCH typically needs more accurate channel measurements. In other words, more pilots are need for decoding PDSCH. On the other hand, PDCCH is typically more robust, i.e., it can tolerate less pilots for decoding. In short, PDCCH pilot density can be lower than PDSCH pilot density. The delta in the pilot densities can be used to transmit DCI data.

For example, if the first part of pilot is used for PDCCH, the PDCCH may be demodulated. After demodulation of PDCCH, the decoded QPSK data symbols are now known and may serve as pilots to the PDSCH. In this way, the DMRS pilot density for PDSCH may be increased as needed to support the higher MCS/SNR requirements of PDSCH. That is, the same REs may be used for two purposes: first for carrying out DCI information, and second for serving as phase reference of DMRS for PDSCH.

As an illustration, pilot density for PDCCH is typically ¼ if a single port is assumed. In PDSCH, the DMRS type A pilot density for a layer is ½ typically. But in an aspect, MIRS DPCCH can use the same ¼ pilot density. Then after the DCI decoding, an effective pilot density of 1 may be achieved, which is greater than the typical DMRS type A pilot density.

In a third proposal, only the PDCCH and PDSCH pilots may be shared. In this proposal, the reencoding of the decoded DCI data would not be necessary.

In a fourth proposal, the shared DCI may be the entire DCI or just a $2^{nd}$ stage DCI, in which the $1^{st}$ stage DCI has minimal amount of data just pointing to the $2^{nd}$ stage DCI. This proposal can limit and simplify the PDCCH monitoring complexity (e.g., in terms of number of blind decodes).

In a fifth proposal, the selection of the pilot structure may be dynamic and signaled through medium access control (MAC) control element (MAC-CE), through radio resource control (RRC), or through DCI (e.g., through the first part of the DCI, which has a known pilot structure). The pilot structure may be selected based on SNR/PDSCH MCS such that sparser structures are used in higher SNRs (higher MCSs). In this way, better usage of the resources may be enabled at higher SNRs and the coverage need not be comprised at lower SNRs. Alternatively, the pilot structure may be fixed.

In a sixth proposal, the resource sharing may be structured in time. In this concept, one or more PDSCH DMRS may be embedded in the PDCCH symbols.

In a seventh proposal, resource sharing may enable rank detection for the control channel. The following list some (not necessarily exhaustive) options for rank detection for the DCI:

Blind hypothesis per rank.

If DCI has two parts, part 1—which may be fixed and not shared with PDSCH pilots—may include the rank information.

Rank one may be the first port of rank 2 such that the receive can always assume rank 2. That is, the single port may be like two ports when one of them has null as a channel. In this instance, rank>2 may be indicated in the first two layers of the DCI. Different types of two-part DCI may be had where first part is on the first two layers, and the second part may be on the rest of the layers.

Rank may be signaled by the PDCCH pilot sequence. Correlating over the sequence may indicate existence of allocation for the UE (which may be similar with cell specific pilot in RG NR) and on the rank used.

Figure 3A:
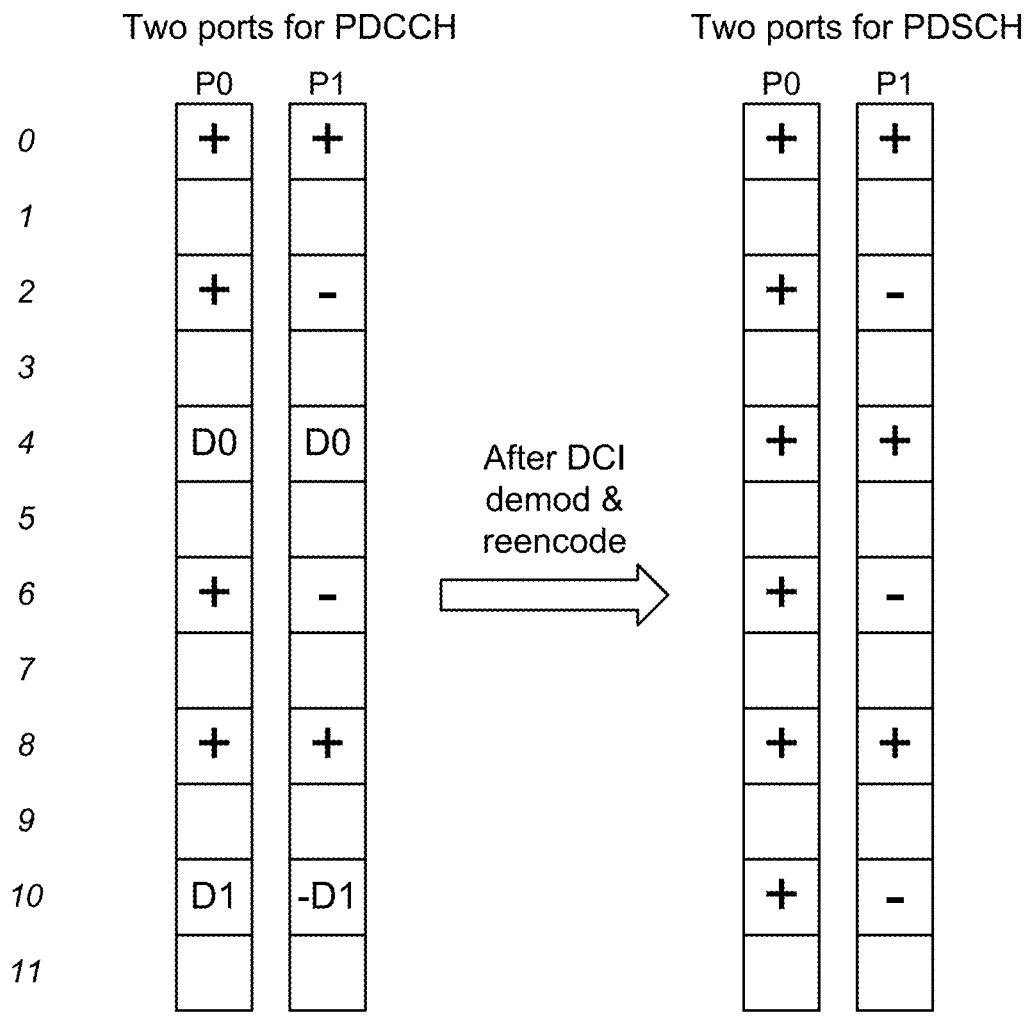
FIGS. 3A-6 illustrate examples of resource sharing to reduce overhead required for control messages in accordance with one or more aspects of the disclosure.

FIG. 3A illustrates an example of two ports resource sharing scheme. Here, each column may be assumed to represent a port. A resource block (RB) of each of the two ports P0, P1 of a network node (e.g., gNB) are shown. Each RB may comprise N resource elements (RE) in frequency (e.g., corresponding to subcarriers) and/or in time (e.g., symbols). The two PDSCH ports may be code division multiplexed (CDM), e.g., using length 2 orthogonal cover codes (OCC)). For simplicity, a symbol of each RB over some number of subcarriers for each of the ports P0, P1 are shown.

Briefly, ports may be used to indicate transmission under some channel. That is, signal on different ports may go through different fading channel. In general, multiple port transmissions enable MIMO transmission that requires estimation of the channel for each port. The number of ports can be larger than 2 and may be equal to the number of MIMO layers. Ports might be frequency division multiplexed (FDMed), time division multiplexed (TDMed) or CMDed. The number of ports can and do impact how data is embedded onto them as shown by one or more examples.

For PDCCH, effectively a one-layer transmission and pilots may be spread as shown in REs marked "+" or "−". These may also serve as the first part of PDSCH DMRS resources. The DCI data (or more generically, "control data") may be embedded or otherwise carried in the REs marked with "Dx" or "−Dx". Two data symbols may be sent per REG—e.g., D0, D1. Each of these may be replicated on the two layers with "+" and "−" implying effectively a single layer transmission is achieved.

Once the PDCCH decoding is performed (e.g., QPSK demodulation and subsequent decoding), the decoded data may be reencoded and used as second part of PDSCH pilots, e.g., as PDSCH DMRS. This results in a pilot structure for PDSCH in which data REs have turned into pilots. The resulting scheme after the decoding, the pilot pattern that is the same as the DMRS type A as specified in the 5G NR standard may be achieved.

As a result, some of the REs—the REs embedded with DCI data—may serve a dual purpose. First, it may serve to carry DCI data, and second, it may serve as pilots for PDSCH. As a result, overhead required for control messages may be reduced.

The remaining REs (with no markings) may be used for PDSCH data or for additional PDCCH data.

It should be noted that this is merely an example. It is contemplated that sparser PDCCH pilot structure (e.g., just single pair of pilots per resource block (RB)) may be used. Other resources may be used for embedding more DCI information per RB. Larger pilot spacing does not significantly impact the performance for even large delay spread channels.

FIG. 3A may be more generalized as follows. For ease of reference, each transmission from a port of the network node may be referred to as a "pilot transmission" in which each pilot transmission may comprise one or more RBs. Also, each RB plurality of REs. The plurality of REs may comprise one or more pilot REs (e.g., REs marked "+" or "−") may or one or more control REs (REs marked "Dx" or "−Dx").

Generally, PDCCH typically can work in low SNR. That is, it can work with sparse DMRS structures. Thus, the pilots that may typically occupy the control REs may not be necessary for decoding the PDCCH. They may be necessary do decode the PDSCH. But once the control REs are decoded, the decoded control data may be reencoded to serve as pilots for the PDSCH.

For ease of reference, the resource block corresponding to the first port P0 will be referred to as the first port RB, and the resource block corresponding to the second port P1 will be referred to second port RB. For the first port RB, every other REs (e.g., RE(0), RE(2), RE(4), RE(6), RE(8), RE(10)) may a pilot RE or a control RE. For example, RE(0), RE(2), RE(6) and RE(8) may be pilot REs. The pilot REs may carry "+" pilot signal, or simply "pilot signal". For the first port RB, RE(4) and RE(10) may be control REs. RE(4) may carry first control data D0 and RE(10) may carry second control data D1. The control data carried by control REs of the first port RB may be encoded.

For second port RB, the same every other REs (e.g., RE(0), RE(2), RE(4), RE(6), RE(8), RE(10)) may a pilot RE or a control RE. For example, RE(0), RE(2), RE(6) and RE(8) may be pilot REs. RE(0) and RE(8) may carry the pilot signal (marked with "+"). However, RE(2) and RE(6) may carry a complementary pilot signal (marked with "−"), which may be opposite or inverse of the pilot signal. Also for the second port RB, RE(4) and RE(10) may be control REs. RE(4) may carry the first control data D0 and RE(10) may carry complementary second control data −D1, which may be opposite of the second control data D1. The control data carried by control REs of the second port RB may be encoded.

In an aspect, the pilot REs of the first and second port RBs may correspond with each other. For example, RE(0), RE(2), RE(6), and RE(8) of the first port RB may correspond respectively with RE(0), RE(2), RE(6), and RE(8) of the second port RB. Similarly, the control REs of the first and second port RBs may correspond with each other. For example, RE(4) and RE(10) of the first port RB may correspond respectively with RE(4) and RE(10) of the second port RB.

In an aspect, the UE may add the second port RB to the first port RB or may subtract the second port RB to the first port RB. If the first and second port RBs are added, then RE(0), RE(4), and RE(8) of the two REGs may strengthen each other (e.g., constructively interfere with each other) while RE(2), RE(6), and RE(10) of the two REGs may cancel each other (e.g., destructively interfere with each other). On the other hand, if the first and second port RBs are subtracted, then then RE(0), RE(4), and RE(8) of the two REGs may cancel each other while RE(2), RE(6), and RE(10) of the two REGs may strength each other. This subtracting or adding of first and second port RBs may enable a better channel estimation to be made.

Figure 3B:

It should be noted that in an aspect, a port may transmit more than one RB. That is, the first and/or the second port P0 and/or P1 may transmit more than one RB as illustrated in FIG. 3B. In FIG. 3A, the first port P0 is shown as transmitting two RBs—first port first RB and first port second RB. Also, the second port P1 is shown as transmitting two RBs—second port first RB and second port second RB. The first port first RB of FIG. 3B may be same or similar to the first port RB of FIG. 3A (e.g., pilot REs RE(0), RE(2), RE(6) and RE(8) carrying pilot signal, control REs RE(4) and RE(10) carrying first and second control data D0, D1). The second port first RB of FIG. 3B may be same or similar to the second port RB of FIG. 3A (e.g., pilot REs RE(0) and RE(8) carrying pilot signal, pilot REs RE(2) and RE(4) carrying complementary pilot signal, control RE(4) first control data D0, and control RE(10) carrying complementary second control data −D1).

For the first port P0, the pattern of pilot and control REs of the first port second RB may be similar to that of the first port first RB. That is, pilot REs RE(0), RE(2), RE(6) and RE(8) may all carry the pilot signal. The control REs may be RE(4) and RE(10) respectively carrying third and fourth control data D2 and D3. For the second port P1, the pattern of pilot and control REs of the second port second RB may be similar to that of the second port first RB. That is, pilot REs RE(0) and RE(8) may carry the pilot signal, and the pilot RES RE(2) and RE(6) may carry the complementary pilot signal. The control RE(4) may the third control data D2, and the control RE(10) may carry a complementary fourth control data −D3. The first port second RB and the second port second RB may be added or subjected. The third and/or the fourth control data D2, D3 may be encoded In an aspect, the third control data D2 may be the same as the first and/or the second control data D0, D1. Alternatively or in addition thereto, the fourth control data D3 may be the same as the first and/or the second control data D0, D1. That is, the information carried in the first and/or the second control data D0, D1 may be totally repeated in the third and/or fourth control data D2, D3, partially repeated (e.g., one of D2, D3 is same as one of D0, D1), or not repeated at all (e.g., D2 and D3 different D0 and D1).

Figure 4:
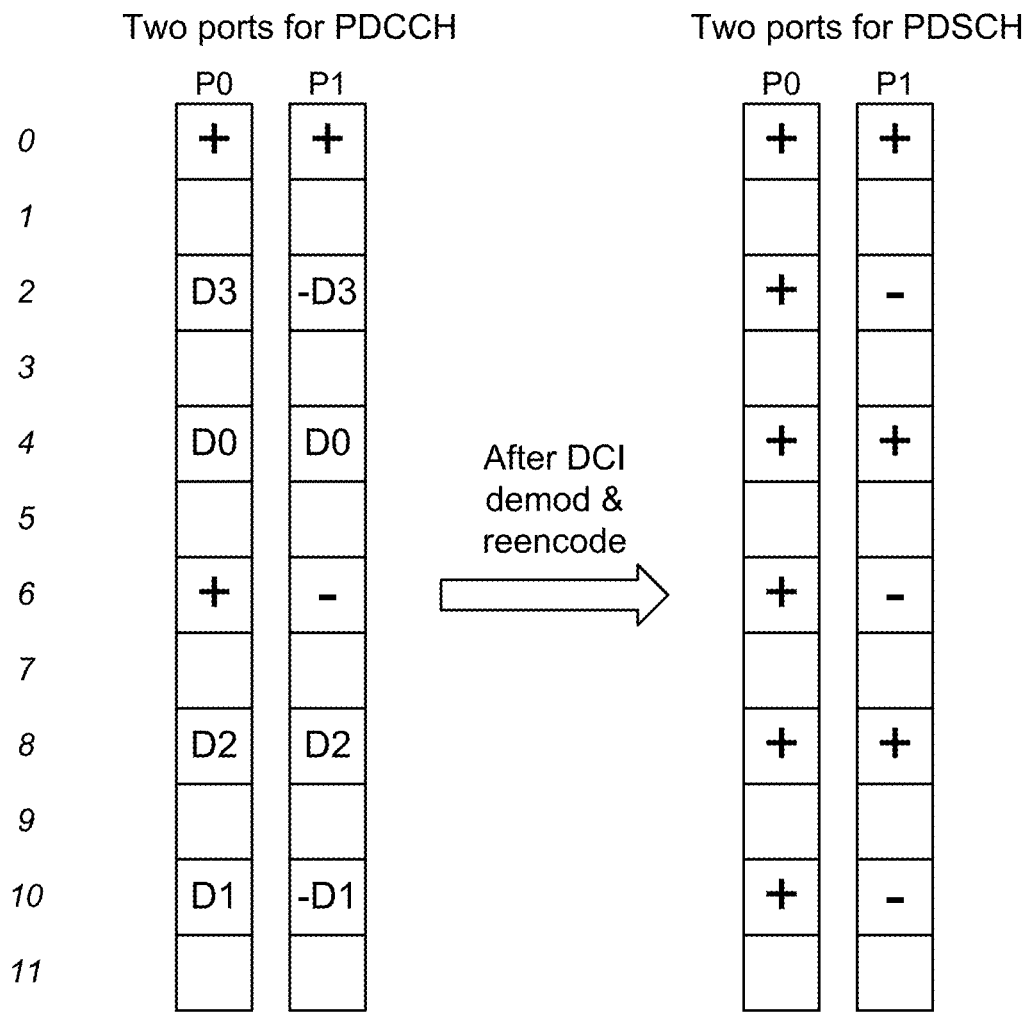

FIG. 4 illustrates another example of two ports resource sharing scheme. Here, the PDCCH pilots are more sparse than in FIG. 3A. That is, there are less pilot REs and more control REs in the port RBs of FIG. 4 relative to the port RBs of FIG. 3A. In FIG. 4, for the first port RB (corresponding to first port P0), RE(0) and RE(6) may be pilot REs carrying the pilot signal. Also for the first port RB, RE(2), RE(4), RE(8) and RE(10) may be control REs. RE(4), RE(10), RE(8) and RE(2) may respectively carry first control data D0, second control data D1, third control data D2, and fourth control data D3. The control data carried by control REs of the first port RB may be encoded.

For the second port RB (corresponding to second port P1), RE(0) and RE(6) may be pilot REs. RE(0) may carry the pilot signal. However, RE(6) may carry the complementary pilot signal. Also for second port RB, RE(2), RE(4), RE(8) and RE(10) may be control REs. RE(4), RE(10), RE(8) and RE(2) may respectively carry the first control data D0, a complementary second control data −D1, the third control data D2, and a complementary fourth control data −D3. The control data carried by control REs of the second port RB may be encoded.

Again, the pilot and control REs of the first and second port RBs may correspond to each other. Also, the UE may add or subtract the first and second port RBs so as to enhance channel estimation. Also again, while not shown, the first and/or the second port P0, P1 may transmit more than one RB. Each additional RB transmitted from the first port P0 may have pilot and control RE similar to that of the first port RB with control REs carrying same or different control data as the first port RB. Similarly, additional RB transmitted from the second port P1 may have pilot and control RE similar to that of the second port RB with control REs carrying same or different control data as the second port RB.

Figure 5:
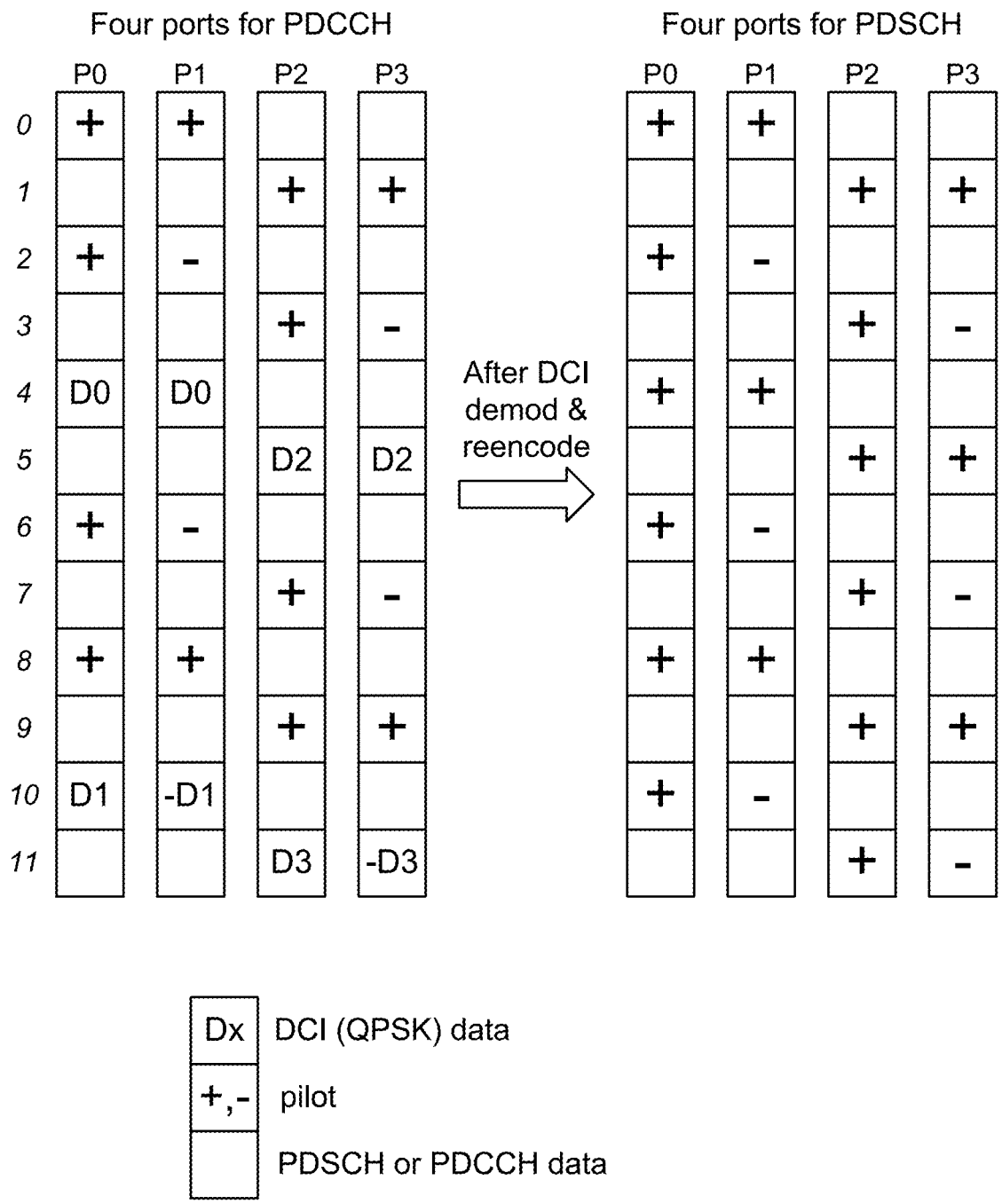

FIG. 5 illustrates another example resource sharing scheme, but this time with four ports. Here, the first and second port RBs (corresponding to first and second ports P0, P1 of the network node) are assumed to be similar to the first and second port RBs of FIG. 3A. But in FIG. 5, two additional port RBs—third and fourth port RBs corresponding to third and fourth ports P2, P3 of the network node—are incorporated.

FIG. 5 illustrates pilot transmission that is effectively a one-layer transmission. The DCI data may be embedded control REs as shown. For example, four data symbols (D0, D1, D2, D3) may be sent per RB. Each control data symbol may be replicated on two layers (e.g., with "+Dx" and "−Dx"), which effectively makes a single layer transmission as currently specified in NR. Again, the decoded control data may be reencoded and used as PDSCH pilots. The resulting pilot scheme may be the same as the DMRS type A for four ports as currently specified.

With that in mind, FIG. 5 will be described as follows. For the first port RB, every even REs (e.g., RE(0), RE(2), RE(4), RE(6), RE(8), RE(10)) may a pilot RE or a control RE. For example, RE(0), RE(2), RE(6) and RE(8) may be pilot REs carrying the pilot signal. Also for the first port RB, RE(4) and RE(10) may be control REs. RE(4) may carry first control data D0 and RE(10) may carry second control data D1. The control data carried by control REs of the first port RB may be encoded.

For second port RB, the same every even REs (e.g., RE(0), RE(2), RE(4), RE(6), RE(8), RE(10)) may a pilot RE or a control RE. For example, RE(0), RE(2), RE(6) and RE(8) may be pilot REs. RE(0) and RE(8) may carry the pilot signal. However, RE(2) and RE(6) may carry the complementary pilot signal. Also for the second port RB, RE(4) and RE(10) may be control REs. RE(4) may carry the first control data D0 and RE(10) may carry the complementary second control data −D1. The control data carried by control REs of the second port RB may be encoded.

For the third port RB, every odd REs (e.g., RE(1), RE(3), RE(5), RE(7), RE(9), RE(11)) may a pilot RE or a control RE. For example, RE(1), RE(3), RE(7) and RE(9) may be pilot REs carrying the pilot signal. Also for the first port RB, RE(5) and RE(11) may be control REs. RE(5) may carry the third control data D2 and RE(11) may carry the fourth control data D3. The control data carried by control REs of the third port RB may be encoded.

For fourth port RB, the same every odd REs (e.g., RE(1), RE(3), RE(5), RE(7), RE(9), RE(11)) may a pilot RE or a control RE. For example, RE(1), RE(3), RE(7) and RE(9) may be pilot REs. RE(1) and RE(9) may carry the pilot signal. However, RE(3) and RE(7) may carry the complementary pilot signal. Also for the second port RB, RE(5) and RE(11) may be control REs. RE(5) may carry the third control data D2 and RE(11) may carry the complementary fourth control data −D3. The control data carried by control REs of the fourth port RB may be encoded.

Similar to FIG. 3B, in FIG. 5, the information carried in the first and/or the second control data D0, D1 may be totally repeated in the third and/or fourth control data D2, D3, partially repeated (e.g., one of D2, D3 is same as one of D0, D1), or not repeated at all (e.g., D2 and D3 different D0 and D1).

Again, while not shown, different pilot structures are contemplated. For example, a sparser PDCCH pilot structure may be used to allow more REs for embedding DCI information.

Figure 6:
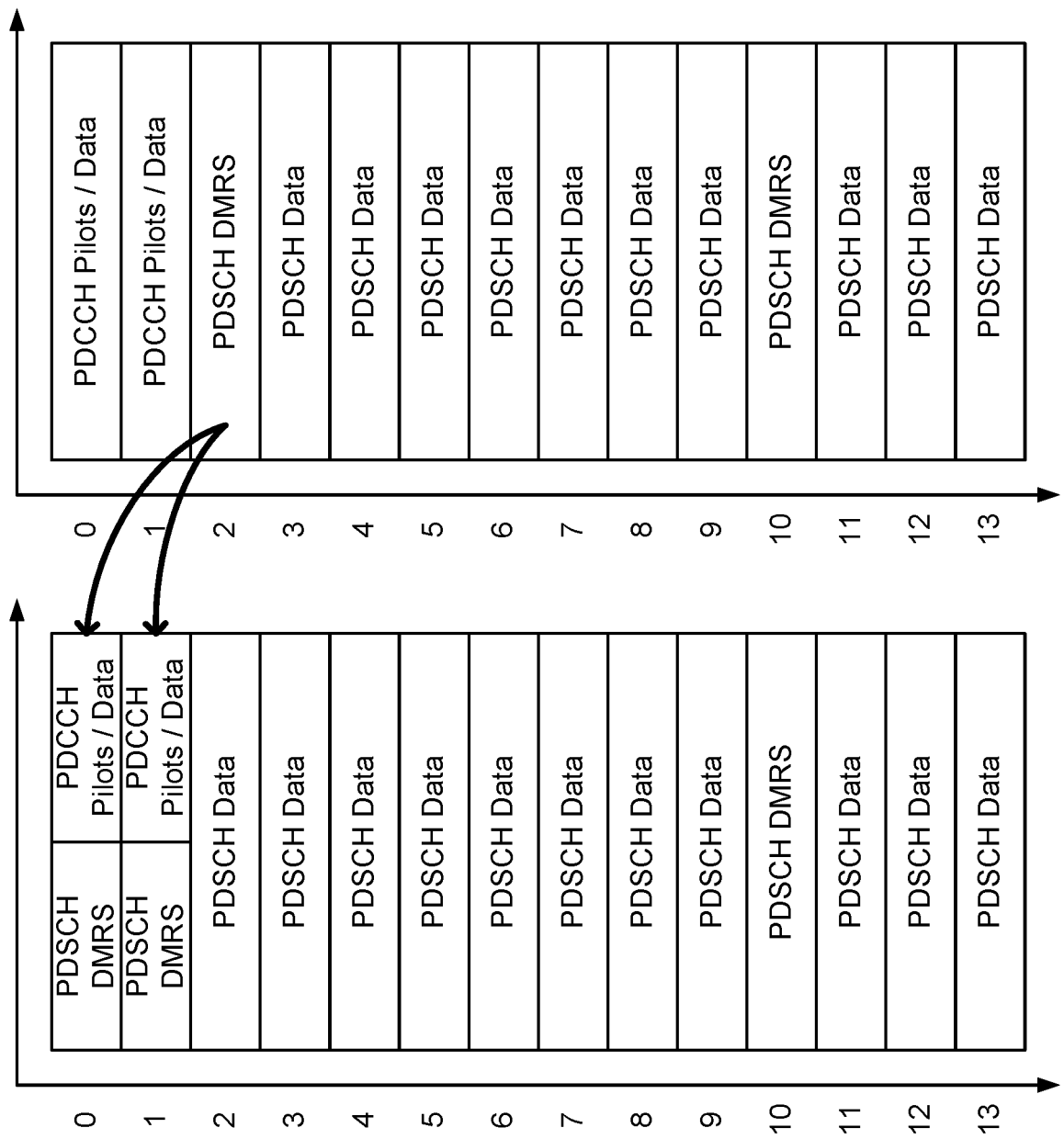

FIG. 6 illustrates a time domain view of resource sharing. An existing scheme is shown on top and an example of a proposed resource sharing scheme is shown on bottom. In both top and bottom views, horizontal axis represents time in symbols. As seen, the existing scheme (top) shows a typical NR slot with two PDCCH symbols and two DMRS symbols.

In one example of using the proposed resource sharing, the first DMRS (e.g., symbol 2) may be replaced by embedding it in the PDCCH symbols. For example, each DMRS/PDCCH symbol may have a sharing scheme of DCI+PDSCH DMRS. The sharing scheme may be dependent on the PDCCH pilot density and/or PDSCH DMRS density. These parameters may differ from symbol to symbol and may be dynamically configured based on expected doppler/time coherence of the channel as well as SNR/MCS for the PDSCH. The PDCCH pilots may be organized in such a way that time domain averaging/interpolation may be performed. In 5G NR, each PDCCH may include pilots. However, since time domain interpolation is sufficient for PDSCH, it should also be more than sufficient for PDCCH allowing for some PDCCH symbols not to include pilots at all.

In this particular example, the second DMRS may be left alone. Of course, this is only an example. That is, it is contemplated that in some instances, the second DMRS may also be embedded in the PDCCH symbols.

Figure 7:
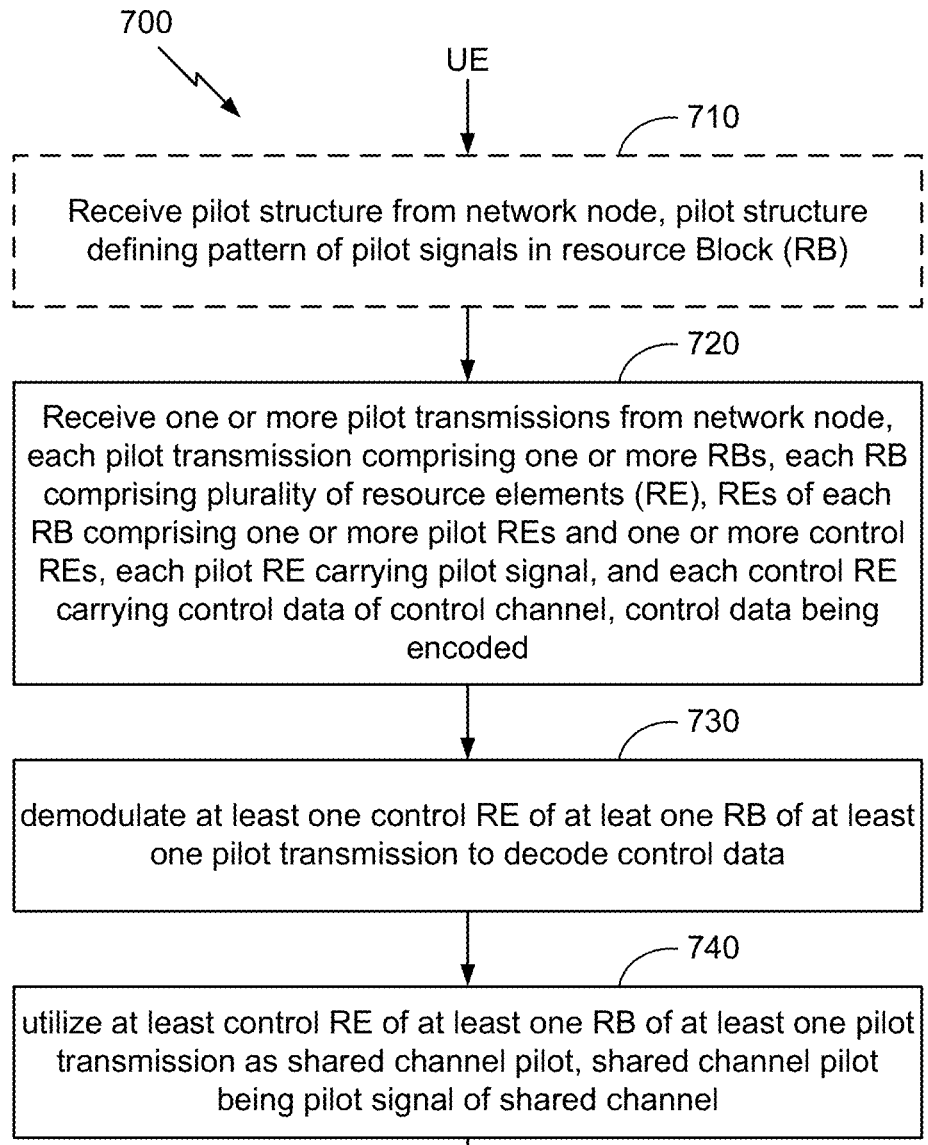
FIGS. 7-8 illustrates flow charts of an exemplary method performed by a user equipment to reduce overhead required for control messages in accordance with one or more aspects of the disclosure.

FIG. 7 illustrates a flow chart of an exemplary method 700 performed by a UE such as apparatus 202 (e.g., see FIG. 2) to share resources, e.g., to reduce overhead of control messages. The memory component 238 may be an example of a non-transitory computer-readable medium storing executable instructions for the UE to perform the method 700.

In block 710, the UE may receive a pilot structure from the network node. Means for performing block 710 may include the transceiver 208, the processing system 232, and/or the memory component 238 of the UE 202. The pilot structure may specify a pattern of pilot signals distributed within a port RB, i.e., an RB corresponding to a port. Different pilot patterns may be specified for different port RBs. For example, the pilot structure may specify a pilot in every even REs (such as for first and second port RBs of FIGS. 3, 4, 5) or a pilot in odd REs (such as for third and fourth port RBS of FIG. 5). Even for the same port, different pilot patterns may be specified for different times. The pilot structure may be received in a RRC message, a MAC-CE, or in a fixed portion (e.g., first part) of the DCI.

Note that block 710 may be optional (as indicated by dashed box). This is because in an aspect, the UE may include default pilot structures corresponding to one or more ports. For example, the UE may be factory set with the default pilot structures. If the UE receives the pilot structure corresponding to one or more ports from the network node, then the received pilot structure may be prioritized.

In block 720, the UE may receive one or more pilot transmissions from the network node. Means for performing block 710 may include the transceiver 208, the processing system 232, and/or the memory component 238 of the UE 202. Each pilot transmission may correspond to a port of the network node, and may comprise one or more port RBs. Each RB may comprise a plurality of resource elements (RE). In an aspect, a number REs for a port RB may be N≥2. For example, N=12. One or more REs of the RB may be pilot REs carrying pilot signals (e.g., pilots or complementary pilots). One or more REs of the RB may be control REs carrying control data of the control channel (e.g., PDCCH). The control data may be encoded. In an aspect, the control REs may be modulated with a particular modulation (e.g., QPSK modulated).

FIGS. 3A-6 illustrate different examples of pilot transmission possibilities. Thus detailed descriptions thereof will not be repeated here.

In block 730, the UE may demodulate a control RE of an RB of a pilot transmission to decode the control data embedded within the control RE. The UE may perform block 730 for one, some, or all control REs of one, some, or all received port RBs. Means for performing block 730 may include the processing system 232 and/or the memory component 238 of the UE 202.

In block 740, the UE may utilize the control RE of the RB as a pilot signal of a shared channel (e.g., DMRS of PDSCH). For example, channel estimation of the shared channel may be made based at least partly on the reencoded control data. For ease of reference, term "shared channel pilot" may be used to refer to the pilot signal of the shared channel. The UE may perform block 740 for one, some, or all control REs of one, some, or all received port RBs. Means for performing block 740 may include the transceiver 208, the processing system 232 and/or the memory component 238 of the UE 202.

Figure 8:
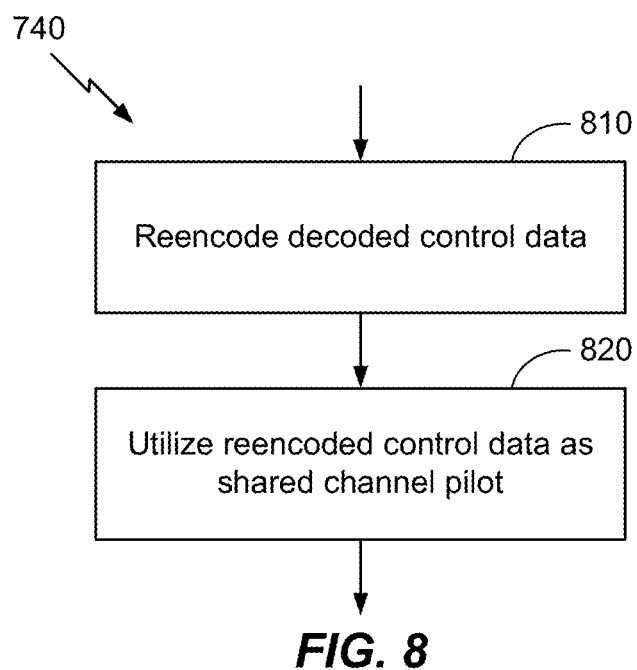

FIG. 8 illustrates a flow chart of an example process that may be performed by the UE to implement block 740. In block 810, the UE may reencode the decoded control data of the control RE. The UE may perform block 810 for one, some, or all decoded control data of one, some, or all received port RBs. Means for performing block 810 may include the processing system 232 and/or the memory component 238 of the UE 202.

In block 820, the UE may utilize the reencoded control data as the shared channel pilot. Means for performing block 820 may include the transceiver 208, the processing system 232 and/or the memory component 238 of the UE 202.

Figure 9:
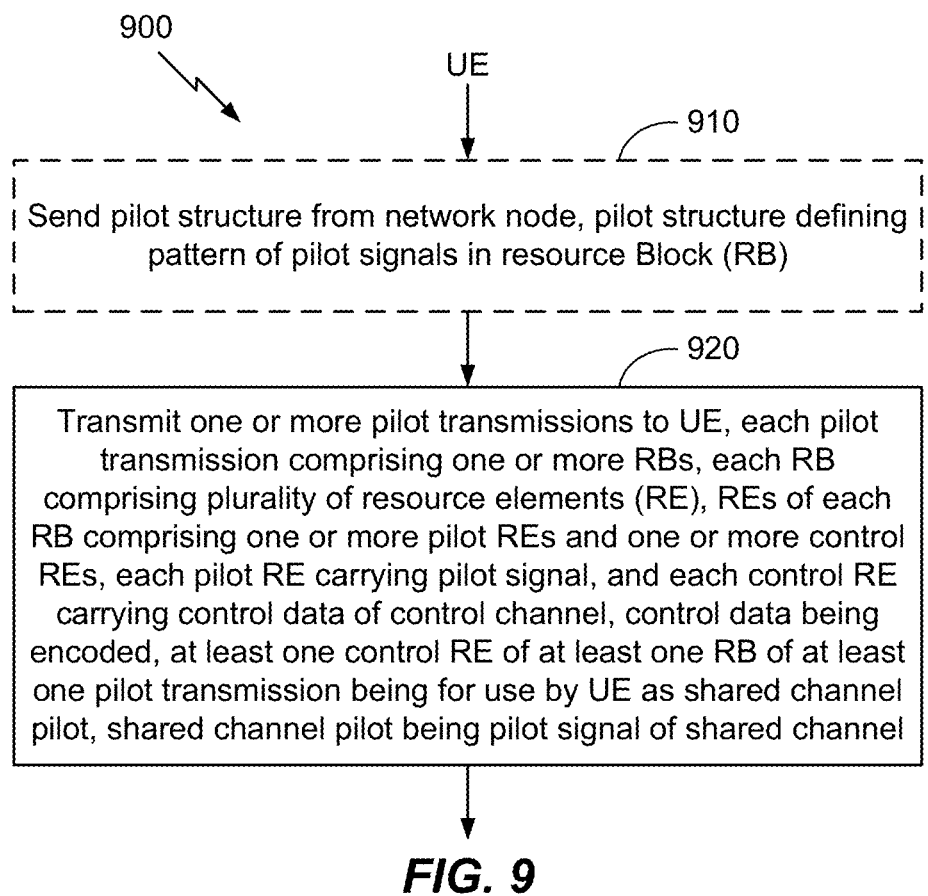
FIG. 9 illustrates a flow chart of an exemplary method performed by a network node to reduce overhead required for control messages in accordance with one or more aspects of the disclosure.

FIG. 9 illustrates a flow chart of an exemplary method 900 performed by a network node (e.g., gNB, access point, base station, etc.) such as apparatus 204 (e.g., see FIG. 2) to share resources, e.g., to reduce overhead of control messages. The memory component 240 may be an example of a non-transitory computer-readable medium storing executable instructions for the network node to perform the method 900.

In block 910, the network may send a pilot structure to the. Means for performing block 910 may include the transceiver 214, the processing system 234, and/or the memory component 240 of the network node 204. The pilot structure is described above with reference to block 710 of method 700. Thus, the details thereof will not be repeated here. Note that block 910 may be optional (as indicated by dashed box) for reasons similar to those described with respect to block 710.

In block 920, the network node may transmit one or more pilot transmissions to the UE. Means for performing block 910 may include the transceiver 214, the processing system 234, and/or the memory component 240 of the network node 204. The pilot transmissions are described above with respect to block 720 of method 700. Thus, the details thereof will not be repeated here.

It should be noted that not all illustrated blocks of FIGS. 7-9 need to be performed, i.e., some blocks may be optional. Also, the numerical references to the blocks in FIGS. 7-9 should not be taken as requiring that the blocks should be performed in a certain order. Indeed, some blocks may be performed concurrently.

Figure 10:
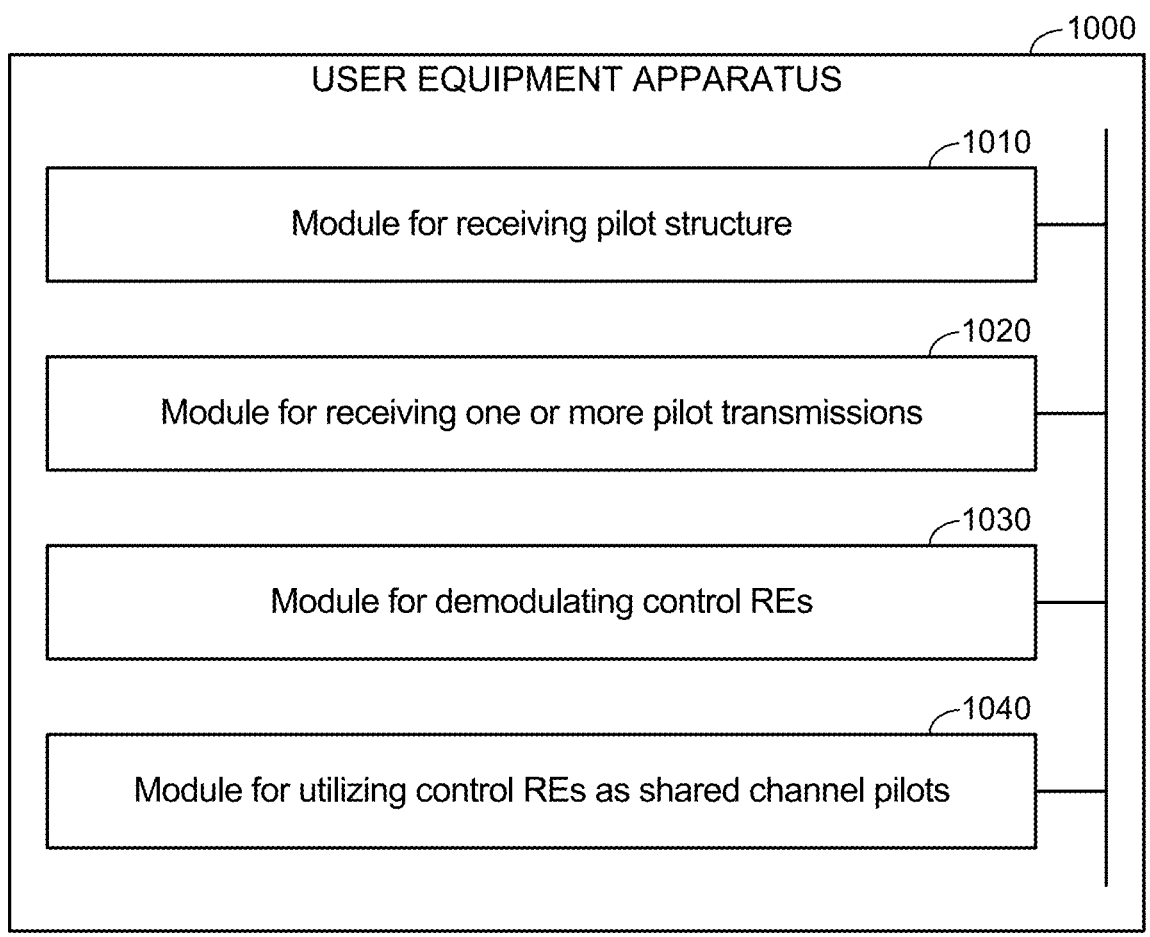
FIG. 10 illustrates a simplified block diagram of several sample aspects of a user equipment apparatus configured to reduce overhead required for control messages in accordance with one or more aspects of the disclosure.

FIG. 10 illustrates an example user equipment apparatus 1000 represented as a series of interrelated functional modules connected by a common bus. Each of the modules may be implemented in hardware or as a combination of hardware and software. For example, the modules may be implemented as any combination of the modules of the UE apparatus 202 of FIG. 2. A module for receiving the pilot structure 1010 may correspond at least in some aspects to a transceiver (e.g., transceiver 208), a processing system (e.g., processing system 232) and/or a memory component (e.g., memory component 238). A module for receiving one or more pilot transmissions 1020 may correspond at least in some aspects to a transceiver (e.g., transceiver 208), a processing system (e.g., processing system 232) and/or a memory component (e.g., memory component 238). A module for demodulating the control REs 1030 may correspond at least in some aspects to a transceiver (e.g., transceiver 208), a processing system (e.g., processing system 232) and/or a memory component (e.g., memory component 238). A module for utilizing the control REs as shared channel pilots 1040 may correspond at least in some aspects to a transceiver (e.g., transceiver 208), a processing system (e.g., processing system 232) and/or a memory component (e.g., memory component 238).

Figure 11:
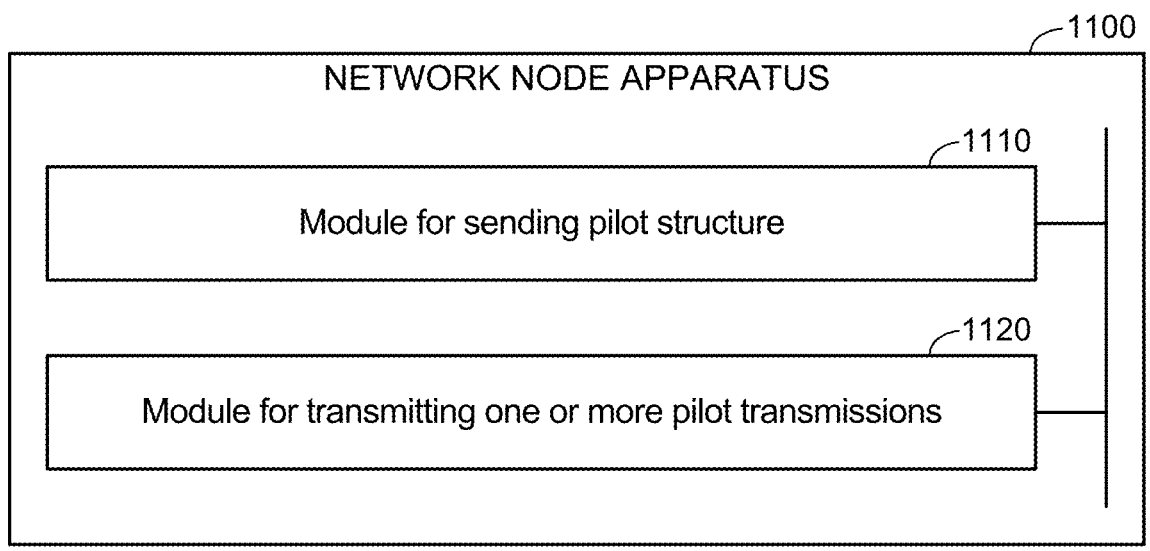
FIG. 11 illustrates a simplified block diagram of several sample aspects of a network node apparatus configured to reduce overhead required for control messages in accordance with one or more aspects of the disclosure

FIG. 11 illustrates an example network node apparatus 1100 represented as a series of interrelated functional modules connected by a common bus. Each of the modules may be implemented in hardware or as a combination of hardware and software. For example, the modules may be implemented as any combination of the modules of the network node apparatus 204 of FIG. 2. A module for sending the pilot structure 1110 may correspond at least in some aspects to a transceiver (e.g., transceiver 214), a processing system (e.g., processing system 234) and/or a memory component (e.g., memory component 240). A module for transmitting one or more pilot transmissions 1120 may correspond at least in some aspects to a transceiver (e.g., transceiver 214), a processing system (e.g., processing system 234) and/or a memory component (e.g., memory component 240).

The functionalities of the modules of FIGS. 10 and 11 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 10 and 11, as well as other components and functions described herein, may be implemented using any suitable means. Such means also may be implemented, at least in part, using corresponding structure as taught herein. For example, the components described above in conjunction with the "module for" components of FIGS. 10 and 11 also may correspond to similarly designated "means for" functionality. Thus, in some aspects one or more of such means may be implemented using one or more of processor components, integrated circuits, or other suitable structure as taught herein.

Implementation examples are described in the following numbered clauses:

Clause 1: A method of a user equipment (UE), comprising: receiving one or more pilot transmissions from a network node, each pilot transmission comprising one or more resource blocks (RB), each RB comprising a plurality of resource elements (RE), the plurality of REs of each RB comprising one or more pilot REs and one or more control REs, each pilot RE carrying a pilot signal and each control RE carrying control data of a control channel, the control data being encoded; demodulating at least one control RE of at least one RB of at least one pilot transmission to decode the control data; and utilizing the at least one control RE of the at least one RB of the at least one pilot transmission as a shared channel pilot, the shared channel pilot being a pilot signal of a shared channel.

Clause 2: The method of Clause 1, wherein the control channel is a physical downlink control channel (PDCCH), the shared channel is a physical downlink shared channel (PDSCH), the control data is a downlink control information (DCI), and the shared channel pilot is a demodulation reference signal (DMRS).

Clause 3: The method of any of Clauses 1-2, wherein utilizing the at least one control RE of the port RB as the shared channel pilot comprises: reencoding the decoded control data; and utilizing the reencoded control data as the shared channel pilot.

Clause 4: The method of any of Clauses 1-3, wherein for each pilot transmission, the one or more pilot REs and the one or more control REs are distributed in at least one RB of that pilot transmission in accordance with a pilot pattern specified in a pilot structure, the pilot pattern defining a pattern of pilot signals distributed within a RB.

Clause 5: The method of Clause 4, further comprising: receiving the pilot structure from the network node prior to receiving the one or more pilot transmissions.

Clause 6: The method of Clause 5, wherein the pilot structure is received in a radio resource control (RRC) message, a medium access control (MAC)—control element (CE), or a fixed portion of a downlink control information (DCI).

Clause 7: The method of any of Clauses 4-6, wherein the one or more pilot transmissions comprise first and second pilot transmissions respectively corresponding to first and second ports of the network node, the first pilot transmission comprising a first port RB comprising N REs and the second pilot transmission comprising a second port RB comprising N REs, N≥2.

Clause 8: The method of Clause 7, wherein every other RE of the first port RB is one of a pilot RE carrying the pilot signal, or a control RE carrying a first control data or a second control data, wherein every other RE of the second port RB is one of a pilot RE carrying the pilot signal or a complementary pilot signal, or a control RE carrying the first control data or a complementary second control data, and wherein the complementary pilot signal and the complementary second control data respectively are opposites of the pilot signal and the second control data.

Clause 9: The method of Clause 8, wherein for at least one pilot RE of the first port RB carrying the pilot signal, a corresponding at least one pilot RE of the second port RB carries the pilot signal, wherein for at least one other pilot RE of the first port RB carrying the pilot signal, a corresponding at least one other pilot RE of the second port RB carries the complementary pilot signal, wherein for at least one control RE of the first port RB carrying the first control data, a corresponding at least one control RE of the second port RB carries the first control data, and wherein for at least one control RE of the first port RB carrying the second control data, a corresponding at least one control RE of the second port RB carries the complementary second control data.

Clause 10: The method of Clause 9, wherein, prior to demodulating, the second port RB is added to or is subtracted from the first port RB.

Clause 11: The method of Clause 7, wherein every other RE of the first port RB is one of a pilot RE carrying the pilot signal, or a control RE carrying a first control data, a second control data, a third control data, or a fourth control data, wherein every other RE of the second port RB is one of a pilot RE carrying the pilot signal or a complementary pilot signal, or a control RE carrying the first control data, a complementary second control data, the third control data, or a complementary fourth control data, and wherein the complementary pilot signal, the complementary second control data, and the complementary fourth control data respectively are opposites of the pilot signal, the second control data, and the fourth control data.

Clause 12: The method of Clause 11, wherein for at least one pilot RE of the first port RB carrying the pilot signal, a corresponding at least one pilot RE of the second port RB carries the pilot signal, wherein for at least one other pilot RE of the first port RB carrying the pilot signal, a corresponding at least one other pilot RE of the second port RB carries the complementary pilot signal, wherein for at least one control RE of the first port RB carrying the first control data, a corresponding at least one control RE of the second port RB carries the first control data, wherein for at least one control RE of the first port RB carrying the second control data, a corresponding at least one control RE of the second port RB carries the complementary second control data, wherein for at least one control RE of the first port RB carrying the third control data, a corresponding at least one control RE of the second port RB carries third control data, and wherein for at least one control RE of the first port RB carrying the fourth control data, a corresponding at least one control RE of the second port RB carries the complementary fourth control data.

Clause 13: The method of Clause 7, wherein the one or more pilot transmissions further comprise third and fourth pilot transmissions respectively corresponding to third and fourth ports of the network node, the third pilot transmission comprising a third port RB comprising N REs and the fourth pilot transmission comprising a fourth port RB comprising N REs.

Clause 14: The method of Clause 13, wherein every even RE of the first port RB is one of a pilot RE carrying the pilot signal, or a control RE carrying a first control data or a second control data, wherein every even RE of the second port RB is one of a pilot RE carrying the pilot signal or a complementary pilot signal, or a control RE carrying the first control data or a complementary second control data, wherein every odd RE of the third port RB is one of a pilot RE carrying the pilot signal, or a control RE carrying a third control data or a fourth control data, wherein every odd RE of the fourth port RB is one of a pilot RE carrying the pilot signal or a complementary pilot signal, or a control RE carrying the third control data or a complementary fourth control data, and wherein the complementary pilot signal, the complementary second control data, and the complementary fourth control data respectively are opposites of the pilot signal, the second control data, and the fourth control data.

Clause 15: The method of Clause 14, wherein for at least one pilot RE of the first port RB carrying the pilot signal, a corresponding at least one pilot RE of the second port RB carries the pilot signal, wherein for at least one other pilot RE of the first port RB carrying the pilot signal, a corresponding at least one other pilot RE of the second port RB carries the complementary pilot signal, wherein for at least one control RE of the first port RB carrying the first control data, a corresponding at least one control RE of the second port RB carries the first control data, wherein for at least one control RE of the first port RB carrying the second control data, a corresponding at least one control RE of the second port RB carries the complementary second control data, wherein for at least one pilot RE of the third port RB carrying the pilot signal, a corresponding at least one pilot RE of the fourth port RB carries the pilot signal, wherein for at least one other pilot RE of the third port RB carrying the pilot signal, a corresponding at least one other pilot RE of the fourth port RB carries the complementary pilot signal, wherein for at least one control RE of the third port RB carrying the third control data, a corresponding at least one control RE of the fourth port RB carries the third control data, and wherein for at least one control RE of the third port RB carrying the fourth control data, a corresponding at least one control RE of the fourth port RB carries the complementary fourth control data.

Clause 16: A user equipment comprising at least one means for performing a method of any of Clauses 1-15.

Clause 17: A user equipment comprising a memory, a transceiver, and a processor communicatively connected to the memory and the transceiver, the processor being configured perform a method of any of Clauses 1-15.

Clause 18: A non-transitory computer-readable medium storing code for a user equipment comprising a memory, a transceiver, and a processor communicatively connected to the memory and the transceiver, and instructions stored in the memory and executable by the processor to cause the user equipment to perform a method of any of Clauses 1-15.

Clause 19: A method of a network node, comprising: transmitting one or more pilot transmissions to a user equipment (UE), each pilot transmission comprising one or more resource blocks (RB), each RB comprising a plurality of resource elements (RE), the plurality of REs of each RB comprising one or more pilot REs and one or more control REs, each pilot RE carrying a pilot signal and each control RE carrying control data of a control channel, the control data being encoded, wherein at least one control RE of at least one RB of at least one pilot transmission is for use by the UE as a shared channel pilot, the shared channel pilot being a pilot signal of a shared channel.

Clause 20: The method of Clause 19, wherein the control channel is a physical downlink control channel (PDCCH), the shared channel is a physical downlink shared channel (PDSCH), the control data is a downlink control information (DCI), and the shared channel pilot is a demodulation reference signal (DMRS).

Clause 21: The method of any of Clauses 19-20, wherein for each pilot transmission, the one or more pilot REs and the one or more control REs are distributed in at least one RB of that pilot transmission in accordance with a pilot pattern specified in a pilot structure, the pilot pattern defining a pattern of pilot signals distributed within the RB.

Clause 22: The method of Clause 21, further comprising: sending the pilot structure to the UE prior to transmitting the one or more pilot transmissions.

Clause 23: The method of Clause 22, wherein the pilot structure is sent in a radio resource control (RRC) message, a medium access control (MAC)—control element (CE), or a fixed portion of a downlink control information (DCI).

Clause 24: The method of any of Clauses 21-23, wherein the one or more pilot transmissions comprise first and second pilot transmissions respectively corresponding to first and second ports of the network node, the first pilot transmission comprising a first port RB comprising N REs and the second pilot transmission comprising a second port RB comprising N REs, N≥2.

Clause 25: The method of Clause 24, wherein every other RE of the first port RB is one of a pilot RE carrying the pilot signal, or a control RE carrying a first control data or a second control data, wherein every other RE of the second port RB is one of a pilot RE carrying the pilot signal or a complementary pilot signal, or a control RE carrying the first control data or a complementary second control data, and wherein the complementary pilot signal and the complementary second control data respectively are opposites of the pilot signal and the second control data.

Clause 26: The method of Clause 25, wherein for at least one pilot RE of the first port RB carrying the pilot signal, a corresponding at least one pilot RE of the second port RB carries the pilot signal, wherein for at least one other pilot RE of the first port RB carrying the pilot signal, a corresponding at least one other pilot RE of the second port RB carries the complementary pilot signal, wherein for at least one control RE of the first port RB carrying the first control data, a corresponding at least one control RE of the second port RB carries the first control data, and wherein for at least one control RE of the first port RB carrying the second control data, a corresponding at least one control RE of the second port RB carries the complementary second control data.

Clause 27: The method of Clause 24, wherein every other RE of the first port RB is one of a pilot RE carrying the pilot signal, or a control RE carrying a first control data, a second control data, a third control data, or a fourth control data, wherein every other RE of the second port RB is one of a pilot RE carrying the pilot signal or a complementary pilot signal, or a control RE carrying the first control data, a complementary second control data, the third control data, or a complementary fourth control data, and wherein the complementary pilot signal, the complementary second control data, and the complementary fourth control data respectively are opposites of the pilot signal, the second control data, and the fourth control data.

Clause 28: The method of Clause 27, wherein for at least one pilot RE of the first port RB carrying the pilot signal, a corresponding at least one pilot RE of the second port RB carries the pilot signal, wherein for at least one other pilot RE of the first port RB carrying the pilot signal, a corresponding at least one other pilot RE of the second port RB carries the complementary pilot signal, wherein for at least one control RE of the first port RB carrying the first control data, a corresponding at least one control RE of the second port RB carries the first control data, wherein for at least one control RE of the first port RB carrying the second control data, a corresponding at least one control RE of the second port RB carries the complementary second control data, wherein for at least one control RE of the first port RB carrying the third control data, a corresponding at least one control RE of the second port RB carries third control data, and wherein for at least one control RE of the first port RB carrying the fourth control data, a corresponding at least one control RE of the second port RB carries the complementary fourth control data.

Clause 29: The method of Clause 24, wherein the one or more pilot transmissions further comprise third and fourth pilot transmissions respectively corresponding to third and fourth ports of the network node, the third pilot transmission comprising a third port RB comprising N REs and the fourth pilot transmission comprising a fourth port RB comprising N REs.

Clause 30: The method of Clause 29, wherein every even RE of the first port RB is one of a pilot RE carrying the pilot signal, or a control RE carrying a first control data or a second control data, wherein every even RE of the second port RB is one of a pilot RE carrying the pilot signal or a complementary pilot signal, or a control RE carrying the first control data or a complementary second control data, wherein every odd RE of the third port RB is one of a pilot RE carrying the pilot signal, or a control RE carrying a third control data or a fourth control data, wherein every odd RE of the fourth port RB is one of a pilot RE carrying the pilot signal or a complementary pilot signal, or a control RE carrying the third control data or a complementary fourth control data, and wherein the complementary pilot signal, the complementary second control data, and the complementary fourth control data respectively are opposites of the pilot signal, the second control data, and the fourth control data.

Clause 31: The method of Clause 30, wherein for at least one pilot RE of the first port RB carrying the pilot signal, a corresponding at least one pilot RE of the second port RB carries the pilot signal, wherein for at least one other pilot RE of the first port RB carrying the pilot signal, a corresponding at least one other pilot RE of the second port RB carries the complementary pilot signal, wherein for at least one control RE of the first port RB carrying the first control data, a corresponding at least one control RE of the second port RB carries the first control data, wherein for at least one control RE of the first port RB carrying the second control data, a corresponding at least one control RE of the second port RB carries the complementary second control data, wherein for at least one pilot RE of the third port RB carrying the pilot signal, a corresponding at least one pilot RE of the fourth port RB carries the pilot signal, wherein for at least one other pilot RE of the third port RB carrying the pilot signal, a corresponding at least one other pilot RE of the fourth port RB carries the complementary pilot signal, wherein for at least one control RE of the third port RB carrying the third control data, a corresponding at least one control RE of the fourth port RB carries the third control data, and wherein for at least one control RE of the third port RB carrying the fourth control data, a corresponding at least one control RE of the fourth port RB carries the complementary fourth control data.

Clause 32: A network node comprising at least one means for performing a method of any of Clauses 19-31.

Clause 33: A network node comprising a memory, a transceiver, and a processor communicatively connected to the memory and the transceiver, the processor being configured perform a method of any of Clauses 19-31.

Clause 34: A non-transitory computer-readable medium storing code for a network node comprising a memory, a transceiver, and a processor communicatively connected to the memory and the transceiver, and instructions stored in the memory and executable by the processor to cause the user equipment to perform a method of any of Clauses 19-31.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A user equipment (UE), comprising:
a memory;
a transceiver; and
a processor communicatively connected to the memory and the transceiver, the processor being configured to:
receive one or more pilot transmissions from a network node, wherein each pilot transmission of the one or more pilot transmissions comprises one or more resource blocks (RB), wherein each RB of the one or more pilot transmissions comprises a respective plurality of resource elements (RE), wherein the respective plurality of REs of each RB comprises one or more respective pilot REs and one or more respective control REs, wherein each pilot RE of the one or more pilot transmissions carries a respective pilot signal and each control RE of the one or more pilot transmissions carries respective control data of a control channel, and wherein the respective control data carried by the one or more pilot transmissions is encoded;
demodulate at least one control RE of at least one RB of at least one pilot transmission of the one or more pilot transmissions to decode the corresponding respective control data carried by the at least one control RE; and
utilize the at least one control RE of the at least one RB of the at least one pilot transmission of the one or more pilot transmissions as a shared channel pilot, wherein the shared channel pilot is a pilot signal of a shared channel,
wherein:
(i) the control channel is a physical downlink control channel (PDCCH), the shared channel is a physical downlink shared channel (PDSCH), the corresponding respective control data is downlink control information (DCI), and the shared channel pilot is a demodulation reference signal (DMRS); or
(ii) to utilize the at least one control RE of the at least one RB of the at least one pilot transmission of the one or more pilot transmissions as the shared channel pilot, the processor is configured to reencode the decoded control data to obtain reencoded control data, and utilize the reencoded control data as the shared channel pilot; or
(iii) for each pilot transmission of the one or more pilot transmissions, the one or more respective pilot REs and the one or more respective control REs are distributed in at least one RB of that pilot transmission in accordance with a pilot pattern specified in a pilot structure, the pilot pattern defining a pattern of pilot signals distributed within an RB, and the one or more pilot transmissions comprising first and second pilot transmissions respectively corresponding to first and second ports of the network node, the first pilot transmission comprising a first port RB comprising N REs, and the second pilot transmission comprising a second port RB comprising N REs, $N \geq 2$.

2. The UE of claim 1, wherein the control channel is the PDCCH, the shared channel is the PDSCH, the corresponding respective control data is the DCI, and the shared channel pilot is the DMRS.

3. The UE of claim 1, wherein, to utilize the at least one control RE of the at least one RB of the at least one pilot transmission of the one or more pilot transmissions as the shared channel pilot, the processor is configured to:

reencode the decoded control data to obtain the reencoded control data; and utilize the reencoded control data as the shared channel pilot.

4. The UE of claim 1, wherein, for each pilot transmission of the one or more pilot transmissions, the one or more respective pilot REs and the one or more respective control REs are distributed in the at least one RB of that pilot transmission in accordance with the pilot pattern specified in the pilot structure, wherein the pilot pattern defines the pattern of pilot signals distributed within the RB.

5. The UE of claim 4, wherein the processor is further configured to:

receive the pilot structure from the network node prior to receipt of the one or more pilot transmissions.

6. The UE of claim 5, wherein, to receive the pilot structure, the processor is configured to receive the pilot structure in a radio resource control (RRC) message, a medium access control (MAC)—control element (CE), or a fixed portion of a downlink control information (DCI).

7. The UE of claim 4, wherein the one or more pilot transmissions comprise the first transmission and the second pilot transmission respectively corresponding to the first port and the second port of the network node, the first pilot transmission comprising the first port RB comprising N REs, and the second pilot transmission comprising the second port RB comprising N REs, N≥2.

8. The UE of claim 7, wherein every other RE of the first port RB is one of:
  a pilot RE carrying a first pilot signal, or
  a control RE carrying a first control data or a second control data,
wherein every other RE of the second port RB is one of:
  a pilot RE carrying the first pilot signal or a second pilot signal that is a complementary of the first pilot signal, or
  a control RE carrying the first control data or a complementary second control data, and
wherein the complementary of the first pilot signal and the complementary second control data respectively are opposites of the first pilot signal and the second control data.

9. The UE of claim 8, wherein for at least one pilot RE of the first port RB carrying the first pilot signal, at least one corresponding pilot RE of the second port RB carries the first pilot signal,
wherein for at least one other pilot RE of the first port RB carrying the first pilot signal, at least one other corresponding pilot RE of the second port RB carries the complementary of the first pilot signal,
wherein for at least one control RE of the first port RB carrying the first control data, at least one corresponding control RE of the second port RB carries the first control data, and
wherein for at least one other control RE of the first port RB carrying the second control data, at least one other corresponding control RE of the second port RB carries the complementary second control data.

10. The UE of claim 9, wherein, prior to demodulation, the second port RB is added to or is subtracted from the first port RB.

11. The UE of claim 7, wherein every other RE of the first port RB is one of:
  a pilot RE carrying a first pilot signal, or
  a control RE carrying a first control data, a second control data, a third control data, or a fourth control data,
wherein every other RE of the second port RB is one of:
  a pilot RE carrying the first pilot signal or a second pilot signal that is a complementary of the first pilot signal, or
  a control RE carrying the first control data, a complementary second control data, the third control data, or a complementary fourth control data, and
wherein the complementary of the first pilot signal, the complementary second control data, and the complementary fourth control data respectively are opposites of the first pilot signal, the second control data, and the fourth control data.

12. The UE of claim 11, wherein for at least one pilot RE of the first port RB carrying the first pilot signal, at least one corresponding pilot RE of the second port RB carries the first pilot signal,
wherein for at least one other pilot RE of the first port RB carrying the first pilot signal, at least one other corresponding pilot RE of the second port RB carries the complementary of the first pilot signal,
wherein for at least a first control RE of the first port RB carrying the first control data, at least a first corresponding control RE of the second port RB carries the first control data,
wherein for at least a second control RE of the first port RB carrying the second control data, at least a second corresponding control RE of the second port RB carries the complementary second control data,
wherein for at least a third control RE of the first port RB carrying the third control data, at least a third corresponding control RE of the second port RB carries third control data, and
wherein for at least a fourth control RE of the first port RB carrying the fourth control data, at least a fourth corresponding control RE of the second port RB carries the complementary fourth control data.

13. The UE of claim 7, wherein the one or more pilot transmissions further comprise third and fourth pilot transmissions respectively corresponding to third and fourth ports of the network node, the third pilot transmission comprising a third port RB comprising N REs and the fourth pilot transmission comprising a fourth port RB comprising N REs.

14. The UE of claim 13, wherein every even RE of the first port RB is one of:
  a pilot RE carrying a first pilot signal, or
  a control RE carrying a first control data or a second control data,
wherein every even RE of the second port RB is one of:
  a pilot RE carrying the first pilot signal or a second pilot signal that is a complementary of the first pilot signal, or
  a control RE carrying the first control data or a complementary second control data,
wherein every odd RE of the third port RB is one of:
  a pilot RE carrying the first pilot signal, or
  a control RE carrying a third control data or a fourth control data, wherein every odd RE of the fourth port RB is one of:
a pilot RE carrying the first pilot signal or the complementary of the first pilot signal, or
a control RE carrying the third control data or a complementary fourth control data, and
wherein the complementary of the first pilot signal, the complementary second control data, and the complementary fourth control data respectively are opposites of the first pilot signal, the second control data, and the fourth control data.

15. The UE of claim 14,
wherein for at least one pilot RE of the first port RB carrying the first pilot signal, at least one corresponding pilot RE of the second port RB carries the first pilot signal,
wherein for at least one other pilot RE of the first port RB carrying the first pilot signal, at least one other corresponding pilot RE of the second port RB carries the complementary of the first pilot signal,
wherein for at least one control RE of the first port RB carrying the first control data, at least one corresponding control RE of the second port RB carries the first control data,
wherein for at least one other control RE of the first port RB carrying the second control data, at least one other corresponding control RE of the second port RB carries the complementary second control data,
wherein for at least one pilot RE of the third port RB carrying the first pilot signal, at least one corresponding pilot RE of the fourth port RB carries the first pilot signal,
wherein for at least one other pilot RE of the third port RB carrying the first pilot signal, at least one other corresponding pilot RE of the fourth port RB carries the complementary of the first pilot signal,
wherein for at least one control RE of the third port RB carrying the third control data, at least one corresponding control RE of the fourth port RB carries the third control data, and
wherein for at least one other control RE of the third port RB carrying the fourth control data, at least one other corresponding control RE of the fourth port RB carries the complementary fourth control data.

16. A network node, comprising:
a memory;
a transceiver; and
a processor communicatively connected to the memory and the transceiver, the processor being configured to;
transmit one or more pilot transmissions to a user equipment (UE), wherein each pilot transmission of the one or more pilot transmissions comprises one or more resource blocks (RB), wherein each RB of the one or more pilot transmissions comprises a respective plurality of resource elements (RE), wherein the respective plurality of REs of each RB comprises one or more respective pilot REs and one or more respective control REs, wherein each pilot RE of the one or more pilot transmissions carries a pilot respective signal and each control RE of the one or more pilot transmissions carries respective control data of a control channel, and wherein the respective control data carried by the one or more pilot transmissions is encoded,
wherein at least one control RE of at least one RB of at least one pilot transmission of the one or more pilot transmissions is for use by the UE as a shared channel pilot, wherein the shared channel pilot is a pilot signal of a shared channel,
wherein:
(i) the control channel is a physical downlink control channel (PDCCH), the shared channel is a physical downlink shared channel (PDSCH), the corresponding respective control data is downlink control information (DCI), and the shared channel pilot is a demodulation reference signal (DMRS); or
(ii) for each pilot transmission of the one or more pilot transmissions, the one or more respective pilot REs and the one or more respective control REs are distributed in at least one RB of that pilot transmission in accordance with a pilot pattern specified in a pilot structure, the pilot pattern defining a pattern of pilot signals distributed within an RB, and the one or more pilot transmissions comprising first and second pilot transmissions respectively corresponding to first and second ports of the network node, the first pilot transmission comprising a first port RB comprising N REs and the second pilot transmission comprising a second port RB comprising N REs, N≥2.

17. The network node of claim 16, wherein the control channel is the PDCCH, the shared channel is the PDSCH, the corresponding respective control data is the DCI, and the shared channel pilot is the DMRS.

18. The network node of claim 16, wherein for each pilot transmission of the one or more pilot transmissions, the one or more respective pilot REs and the one or more respective control REs are distributed in the at least one RB of that pilot transmission in accordance with the pilot pattern specified in the pilot structure, wherein the pilot pattern defines the pattern of pilot signals distributed within the RB.

19. The network node of claim 18, wherein the processor is further configured to:
send the pilot structure to the UE prior to transmission of the one or more pilot transmissions.

20. The network node of claim 19, wherein, to send the pilot structure, the processor is configured to send the pilot structure in a radio resource control (RRC) message, a medium access control (MAC)—control element (CE), or a fixed portion of a downlink control information (DCI).

21. The network node of claim 18, wherein the one or more pilot transmissions comprise the first transmission and the second pilot transmission respectively corresponding to the first port and the second port of the network node, the first pilot transmission comprising the first port RB comprising N REs and the second pilot transmission comprising the second port RB comprising N REs, N≥2.

22. The network node of claim 21,
wherein every other RE of the first port RB is one of:
a pilot RE carrying a first pilot signal, or
a control RE carrying a first control data or a second control data,
wherein every other RE of the second port RB is one of:
a pilot RE carrying the first pilot signal or a second pilot signal that is a complementary of the first pilot signal, or
a control RE carrying the first control data or a complementary second control data, and
wherein the complementary of the first pilot signal and the complementary second control data respectively are opposites of the first pilot signal and the second control data.

23. The network node of claim 22,
wherein for at least one pilot RE of the first port RB carrying the first pilot signal, at least one corresponding pilot RE of the second port RB carries the first pilot signal,
wherein for at least one other pilot RE of the first port RB carrying the first pilot signal, at least one other corresponding pilot RE of the second port RB carries the complementary of the first pilot signal,
wherein for at least one control RE of the first port RB carrying the first control data, at least one corresponding control RE of the second port RB carries the first control data, and
wherein for at least one other control RE of the first port RB carrying the second control data, at least one corresponding control RE of the second port RB carries the complementary second control data.

24. The network node of claim 21,
wherein every other RE of the first port RB is one of:
a pilot RE carrying a first pilot signal, or
a control RE carrying a first control data, a second control data, a third control data, or a fourth control data,
wherein every other RE of the second port RB is one of:
a pilot RE carrying the first pilot signal or a second pilot signal that is a complementary of the first pilot signal, or
a control RE carrying the first control data, a complementary second control data, the third control data, or a complementary fourth control data, and
wherein the complementary of the first pilot signal, the complementary second control data, and the complementary fourth control data respectively are opposites of the first pilot signal, the second control data, and the fourth control data.

25. The network node of claim 24,
wherein for at least one pilot RE of the first port RB carrying the first pilot signal, at least one corresponding pilot RE of the second port RB carries the first pilot signal,
wherein for at least one other pilot RE of the first port RB carrying the first pilot signal, at least one other corresponding pilot RE of the second port RB carries the complementary of the first pilot signal,
wherein for at least a first control RE of the first port RB carrying the first control data, at least a first corresponding control RE of the second port RB carries the first control data,
wherein for at least a second control RE of the first port RB carrying the second control data, at least a second corresponding control RE of the second port RB carries the complementary second control data,
wherein for at least a third control RE of the first port RB carrying the third control data, at least a third corresponding control RE of the second port RB carries third control data, and
wherein for at least a fourth control RE of the first port RB carrying the fourth control data, at least a fourth corresponding control RE of the second port RB carries the complementary fourth control data.

26. The network node of claim 21, wherein the one or more pilot transmissions further comprise third and fourth pilot transmissions respectively corresponding to third and fourth ports of the network node, the third pilot transmission comprising a third port RB comprising N REs and the fourth pilot transmission comprising a fourth port RB comprising N REs.

27. The UE of claim 26,
wherein every even RE of the first port RB is one of:
a pilot RE carrying a first pilot signal, or
a control RE carrying a first control data or a second control data,
wherein every even RE of the second port RB is one of:
a pilot RE carrying the first pilot signal or a second pilot signal that is a complementary of the first pilot signal, or
a control RE carrying the first control data or a complementary second control data,
wherein every odd RE of the third port RB is one of:
a pilot RE carrying the first pilot signal, or
a control RE carrying a third control data or a fourth control data,
wherein every odd RE of the fourth port RB is one of:
a pilot RE carrying the first pilot signal or the complementary of the first pilot signal, or
a control RE carrying the third control data or a complementary fourth control data, and
wherein the complementary of the first pilot signal, the complementary second control data, and the complementary fourth control data respectively are opposites of the first pilot signal, the second control data, and the fourth control data.

28. The UE of claim 27,
wherein for at least one pilot RE of the first port RB carrying the first pilot signal, at least one corresponding pilot RE of the second port RB carries the first pilot signal,
wherein for at least one other pilot RE of the first port RB carrying the first pilot signal, at least one other corresponding pilot RE of the second port RB carries the complementary of the first pilot signal,
wherein for at least one control RE of the first port RB carrying the first control data, at least one corresponding control RE of the second port RB carries the first control data,
wherein for at least one other control RE of the first port RB carrying the second control data, at least one other corresponding control RE of the second port RB carries the complementary second control data,
wherein for at least one pilot RE of the third port RB carrying the first pilot signal, at least one corresponding pilot RE of the fourth port RB carries the first pilot signal,
wherein for at least one other pilot RE of the third port RB carrying the first pilot signal, at least one other corresponding pilot RE of the fourth port RB carries the complementary of the first pilot signal,
wherein for at least one control RE of the third port RB carrying the third control data, at least one corresponding control RE of the fourth port RB carries the third control data, and
wherein for at least one other control RE of the third port RB carrying the fourth control data, at least one other corresponding control RE of the fourth port RB carries the complementary fourth control data.

29. A method of a user equipment (UE), the method comprising:
receiving one or more pilot transmissions from a network node, wherein each pilot transmission of the one or more pilot transmissions comprises one or more resource blocks (RB), wherein each RB of the one or more pilot transmissions comprises a respective plurality of resource elements (RE), wherein the respective plurality of REs of each RB comprises one or more respective pilot REs and one or more respective control REs, wherein each pilot RE of the one or more pilot transmissions carries a respective pilot signal and each control RE of the one or more pilot transmissions carries respective control data of a control channel, and wherein the respective control data carried by the one or more pilot transmissions is encoded;

demodulating at least one control RE of at least one RB of at least one pilot transmission of the one or more pilot transmissions to decode the corresponding respective control data carried by the at least one control RE; and utilizing the at least one control RE of the at least one RB of the at least one pilot transmission of the one or more pilot transmissions as a shared channel pilot, wherein the shared channel pilot is a pilot signal of a shared channel, wherein:
- (i) the control channel is a physical downlink control channel (PDCCH), the shared channel is a physical downlink shared channel (PDSCH), the corresponding respective control data is downlink control information (DCI), and the shared channel pilot is a demodulation reference signal (DMRS); or
- (ii) to utilize the at least one control RE of the at least one RB of the at least one pilot transmission of the one or more pilot transmissions as the shared channel pilot, the method further comprises reencoding the decoded control data to obtain reencoded control data, and utilizing the reencoded control data as the shared channel pilot; or
- (iii) for each pilot transmission of the one or more pilot transmissions, the one or more respective pilot REs and the one or more respective control REs are distributed in at least one RB of that pilot transmission in accordance with a pilot pattern specified in a pilot structure, the pilot pattern defining a pattern of pilot signals distributed within an RB, and the one or more pilot transmissions comprising first and second pilot transmissions respectively corresponding to first and second ports of the network node, the first pilot transmission comprising a first port RB comprising N REs, and the second pilot transmission comprising a second port RB comprising N REs, $N \geq 2$.

30. A method of a network node, the method comprising:

transmitting one or more pilot transmissions to a user equipment (UE), wherein each pilot transmission of the one or more pilot transmissions comprises one or more resource blocks (RB), wherein each RB of the one or more pilot transmissions comprises a respective plurality of resource elements (RE), wherein the respective plurality of REs of each RB comprises one or more respective pilot REs and one or more respective control REs, wherein each pilot RE of the one or more pilot transmissions carries a respective pilot signal and each control RE of the one or more pilot transmissions carries respective control data of a control channel, and wherein the respective control data carried by the one or more pilot transmissions is encoded, wherein at least one control RE of at least one RB of at least one pilot transmission of the one or more pilot transmissions is for use by the UE as a shared channel pilot, wherein the shared channel pilot is a pilot signal of a shared channel, wherein:
- (i) the control channel is a physical downlink control channel (PDCCH), the shared channel is a physical downlink shared channel (PDSCH), the corresponding respective control data is downlink control information (DCI), and the shared channel pilot is a demodulation reference signal (DMRS); or
- (ii) for each pilot transmission of the one or more pilot transmissions, the one or more respective pilot REs and the one or more respective control REs are distributed in at least one RB of that pilot transmission in accordance with a pilot pattern specified in a pilot structure, the pilot pattern defining a pattern of pilot signals distributed within an RB, and the one or more pilot transmissions comprising first and second pilot transmissions respectively corresponding to first and second ports of the network node, the first pilot transmission comprising a first port RB comprising N REs and the second pilot transmission comprising a second port RB comprising N REs, $N \geq 2$.

* * * * *